US012533881B2

(12) United States Patent
Nakayama

(10) Patent No.: US 12,533,881 B2
(45) Date of Patent: Jan. 27, 2026

(54) HEAD CHIPS AND RELATED DEVICES FOR INKJET PRINTERS

(71) Applicant: SII Printek Inc., Chiba (JP)

(72) Inventor: Hitoshi Nakayama, Chiba (JP)

(73) Assignee: SII PRINTEK, INC., Chiba (JP)

( * ) Notice: Subject to any disclaimer, the term of this patent is extended or adjusted under 35 U.S.C. 154(b) by 139 days.

(21) Appl. No.: 18/535,090

(22) Filed: Dec. 11, 2023

(65) Prior Publication Data

US 2024/0198671 A1 Jun. 20, 2024

(30) Foreign Application Priority Data

Dec. 16, 2022 (JP) ................................ 2022-201231

(51) Int. Cl.

| | |
|---|---|
| ***B41J 2/14*** | (2006.01) |
| ***B41J 2/045*** | (2006.01) |
| ***B41J 2/095*** | (2006.01) |
| ***B41J 2/155*** | (2006.01) |

(52) U.S. Cl.

CPC ....... *B41J 2/14233* (2013.01); *B41J 2/04581* (2013.01); *B41J 2/095* (2013.01); *B41J 2/14072* (2013.01); *B41J 2/1433* (2013.01); *B41J 2002/14306* (2013.01); *B41J 2/155* (2013.01)

(58) Field of Classification Search

CPC .... B41J 2/14233; B41J 2/04581; B41J 2/095; B41J 2/14072; B41J 2/1433; B41J 2/155; B41J 2002/14306; B41J 2/14032; B41J 2/17546

See application file for complete search history.

(56) References Cited

U.S. PATENT DOCUMENTS

2002/0140786 A1* 10/2002 Sugahara ............. B41J 2/14209 347/72

FOREIGN PATENT DOCUMENTS

| | | | |
|---|---|---|---|
| JP | 10-058674 A | 3/1998 | |
| WO | WO-2021186682 A1 * | 9/2021 | ................ B41J 2/14 |

OTHER PUBLICATIONS

Search Report in European Application No. 23216451.7, dated Apr. 25, 2024 (23 pages).

* cited by examiner

*Primary Examiner* — Bradley W Thies

(74) *Attorney, Agent, or Firm* — Crowell & Moring LLP

(57) ABSTRACT

A head chip, a liquid jet head, and a liquid jet recording devices each capable of increasing the generated pressure while achieving an increase in manufacturing efficiency and yield ratio are provided. The head chip includes a flow channel member provided with a pressure chamber containing a liquid, an actuator plate on the flow channel member in a state of being opposed in a first direction to the pressure chamber, and a drive electrode configured to deform the actuator plate in the first direction to change a volume of the pressure chamber. A recessed part is formed in a portion of the actuator plate, the portion overlapping the pressure chamber when viewed from the first direction. The drive electrode includes a first electrode formed on an inner surface of the recessed part, and a first opposed electrode which is formed on an upper surface of the actuator plate.

9 Claims, 31 Drawing Sheets

HEAD CHIPS AND RELATED DEVICES FOR INKJET PRINTERS

RELATED APPLICATIONS

This application claims priority to Japanese Patent application No. JP2022-201231 filed on Dec. 16, 2022, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

In a head chip installed in an inkjet printer, an electric field is generated in an actuator plate formed of a piezoelectric material to deform the actuator plate to thereby generate a pressure variation in a pressure chamber. Thus, ink contained in the pressure chamber is ejected through a nozzle hole.

As a deformation mode of the actuator plate, there is cited a so-called shear mode in which a shear deformation (a thickness-shear deformation) is caused in the actuator plate due to the electric field to be generated in the actuator plate. In the shear mode, there are included a so-called wall-bend type and a roof-shoot type.

The head chip of the wall-bend type has a configuration in which the pressure chamber is provided to the actuator plate itself. In the head chip of the wall-bend type, by partition walls opposed to each other across the pressure chamber deforming in a direction coming closer to or getting away from each other, the pressure variation is generated in the pressure chamber.

In contrast, the head chip of the roof-shoot type has a configuration in which the actuator plate is arranged so as to be opposed to the pressure chambers provided to a flow channel member. In the head chip of the roof-shoot type, by the actuator plate deforming in the thickness direction, the pressure variation is generated in the pressure chamber.

Incidentally, in the head chip of the roof-shoot type, since the actuator plate faces one of surfaces of the pressure chamber alone, there is a problem that it is difficult to ensure the pressure (elastic energy) to be generated in the pressure chamber compared to the head chip of the wall-bend type.

In the head chip of the roof-shoot type, as a configuration for achieving the increase in pressure to be generated, it is conceivable to stack the actuator plates (see, e.g., JPH10-58674A).

However, in the related art, even when stacking the actuator plates, it is difficult to increase the pressure to be generated in accordance with the number of layers stacked. Further, when stacking the actuator plates, since it is necessary to arrange electrodes in each of the layers, a decrease in manufacturing efficiency and yield ratio is incurred.

The present disclosure provides a head chip, a liquid jet head, and a liquid jet recording device each capable of increasing the pressure to be generated while achieving an increase in manufacturing efficiency and yield ratio.

SUMMARY OF THE INVENTION

In order to solve the problems described above, the present disclosure adopts the following aspects.

(1) A head chip according to an aspect of the present disclosure includes a flow channel member provided with a pressure chamber containing a liquid, an actuator plate which is arranged on the flow channel member in a state of being opposed in a first direction to the pressure chamber, and which has a polarization direction set to the first direction, and a drive electrode which is formed on the actuator plate, and which is configured to deform the actuator plate in the first direction to change a volume of the pressure chamber, wherein a shape changing part formed of a protruding part protruding with respect to a first surface facing to the flow channel member in the first direction, or a recessed part recessed with respect to the first surface is formed in a portion of the actuator plate, the portion overlapping the pressure chamber when viewed from the first direction, and the drive electrode includes a first electrode formed on a surface of the shape changing part, and a first opposed electrode which is formed on a second surface of the actuator plate so as to be opposed to the first electrode, the second surface facing to an opposite side to the first surface in the first direction, and which is configured to generate a potential difference from the first electrode.

According to the present aspect, by generating the potential difference between the first electrode and the first opposed electrode, it is possible to generate an electric field in the polarization direction of the actuator plate. Thus, by deforming the actuator plate in the Z direction in the bend mode (a bimorph type), it is possible to change the volume of the pressure chamber.

In particular, in the present aspect, by forming the first electrode on the surface of the shape changing part formed of the recessed part or the protruding part, it is possible to ensure the surface area of the first electrode. Therefore, it is easy to ensure the potential difference generated between the first electrode and the first opposed electrode. As a result, it is possible to increase the electric field generated in the actuator plate, and thus, it is possible to increase the pressure to be generated in the pressure chamber when jetting the liquid. Further, since it is possible to increase the pressure to be generated only by forming the first electrode on the surface of the shape changing part, it is possible to achieve an increase in manufacturing efficiency and yield ratio compared to a configuration in which a plurality of actuator plates is stacked as in the related art. Moreover, by providing the shape changing part to the actuator plate, it is possible to increase the rigidity in the first direction of the actuator plate.

(2) In the head chip according to the aspect (1) described above, it is preferable that the shape changing part includes an end surface facing to the first direction, and a side surface which is configured to connect an outer circumferential edge of the end surface and the first surface to each other, and which faces to a second direction crossing the first direction, and the first electrode is formed throughout the end surface and the side surface.

According to the present aspect, since it is possible to ensure the surface area of the first electrode, it is possible to increase the pressure to be generated in the pressure chamber when jetting the liquid.

Moreover, by forming the first electrode on the end surface of the shape changing part, it is possible to decrease the distance between the first electrode and the first opposed electrode. Thus, it becomes easy to increase the electric field to be generated in the actuator plate, and thus, it is possible to effectively increase the pressure to be generated in the pressure chamber.

(3) In the head chip according to one of the aspects (1) and (2) described above, it is preferable that the drive electrode includes a second electrode which is formed on the first surface so as to be adjacent to the first electrode, and which is configured to generate a potential difference from the first electrode.

According to the present aspect, by generating the potential difference between the first electrode and the second electrode, it is possible to generate an electric field in a direction crossing a polarization direction of the actuator plate. Thus, by deforming the actuator plate in the first direction in the shear mode (the roof-shoot type), it is possible to change the volume of the pressure chamber. In this case, it is possible to deform the actuator plate in the first direction in both of the drive modes, namely the shear mode and the bend mode, and thus, it is possible to increase the pressure to be generated in the pressure chamber.

(4) In the head chip according to the aspect (2) described above, it is preferable that the drive electrode includes a second opposed electrode which is formed so as to be opposed to the second electrode on the second surface, and which is formed so as to be adjacent to the first opposed electrode, and the second opposed electrode is configured to generate a potential difference in the first direction from the second electrode, and which is configured to generate a potential difference in a second direction crossing the first direction from the first opposed electrode.

According to the present aspect, since the first opposed electrode and the second opposed electrode are disposed on the second surface of the actuator plate so as to be adjacent to each other, it is possible to deform the actuator plate in the shear mode (the roof-shoot type) due to the potential difference generated between the first opposed electrode and the second opposed electrode.

(5) In the head chip according to any of the aspects (1) through (4) described above, it is preferable that a groove part recessed in the first direction with respect to the second surface is provided to the actuator plate.

According to the present aspect, when the actuator plate deforms in the first direction, the groove part functions as a clearance part for allowing the deformation of the actuator plate. Thus, it becomes easy to ensure the amount of the deformation of the actuator plate.

(6) In the head chip according to the aspect (5) described above, it is preferable that the groove part penetrates the actuator plate in the first direction.

According to the present aspect, since the groove part penetrates the actuator plate, it is easy to allow the deformation of the actuator plate when jetting the liquid. Therefore, it is possible to increase the pressure to be generated by the pressure chamber.

(7) In the head chip according to one of the aspects (5) and (6) described above, it is preferable that an in-groove electrode which generates a potential difference from the first electrode is formed on an inner surface of the groove part.

According to the present aspect, an electric field in a direction crossing a polarization direction is generated in the actuator plate due to the potential difference generated between the first electrode and the in-groove electrode. As a result, the thickness-shear deformation occurs in a portion (hereinafter referred to as a partition part) of the actuator plate, the portion being partitioned by the groove part in the shape changing part, so as to fall over inside the groove part in the shear mode. Thus, when jetting the liquid, the partition part deforms so that the volume of the groove part expands or contracts. On this occasion, since the groove part functions as a clearance part for allowing the deformation of the partition part, it becomes easy to ensure an amount of deformation of the actuator plate, and thus, it is possible to increase the pressure to be generated by the pressure chamber.

(8) A liquid jet head according to the present disclosure includes the head chip according to any one of the aspects (1) through (7) described above.

According to the present aspect, since the head chip according to the aspect described above is provided, it is possible to provide the liquid jet head which is capable of exerting the desired jet performance, and which is high in quality.

(9) A liquid jet recording device according to an aspect of the present disclosure includes the liquid jet head according to the aspect (8) described above.

According to the present aspect, since the liquid jet head according to the aspect described above is provided, it is possible to provide the liquid jet recording device which is capable of exerting the desired jet performance, and which is high in quality.

According to an aspect of the present disclosure, it is possible to increase the pressure to be generated while achieving the increase in manufacturing efficiency and yield ratio.

DETAILED DESCRIPTION OF THE PREFERRED EMBODIMENTS

Figure 1:
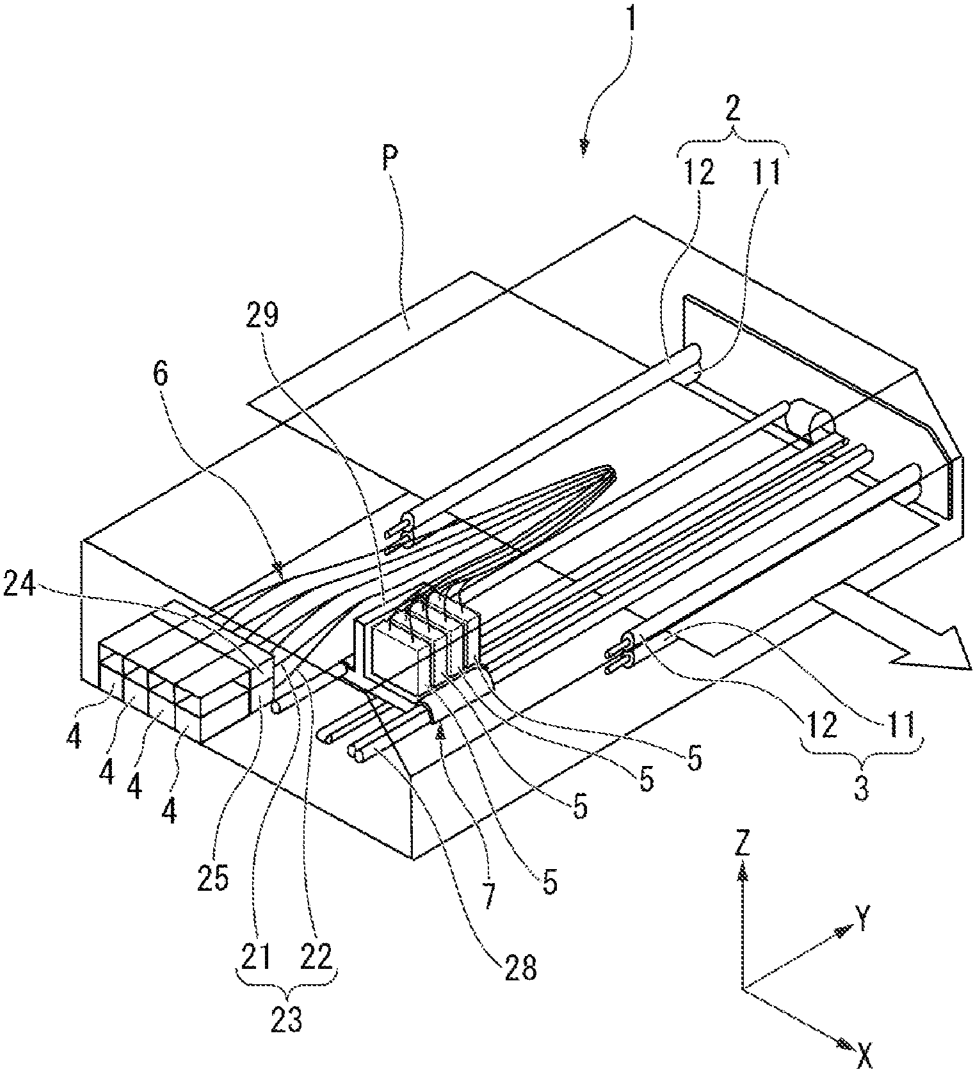
FIG. 1 is a schematic configuration diagram of an inkjet printer according to a first embodiment.

Some embodiments according to the present disclosure will hereinafter be described with reference to the drawings. In the embodiments and modified examples hereinafter described, constituents corresponding to each other are denoted by the same reference symbols, and the description thereof will be omitted in some cases. In the following description, expressions representing relative or absolute arrangements such as "parallel," "perpendicular," "central," and "coaxial" not only represent strictly such arrangements, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (a liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink according to the ink tanks 4 coupled thereto.

Figure 2:
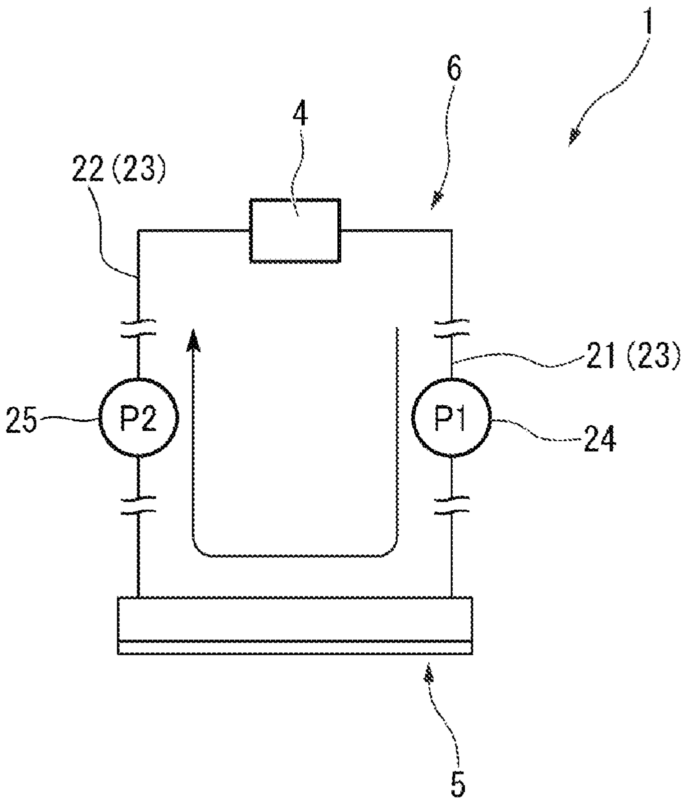
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes the inside of the ink discharge tube 22 to suck the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

<Inkjet Heads 5>

The inkjet heads 5 are mounted on the carriage 29. In the illustrated example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a control section (not shown) for applying a drive voltage to the head chip 50.

<Head Chip 50>

Figure 3:
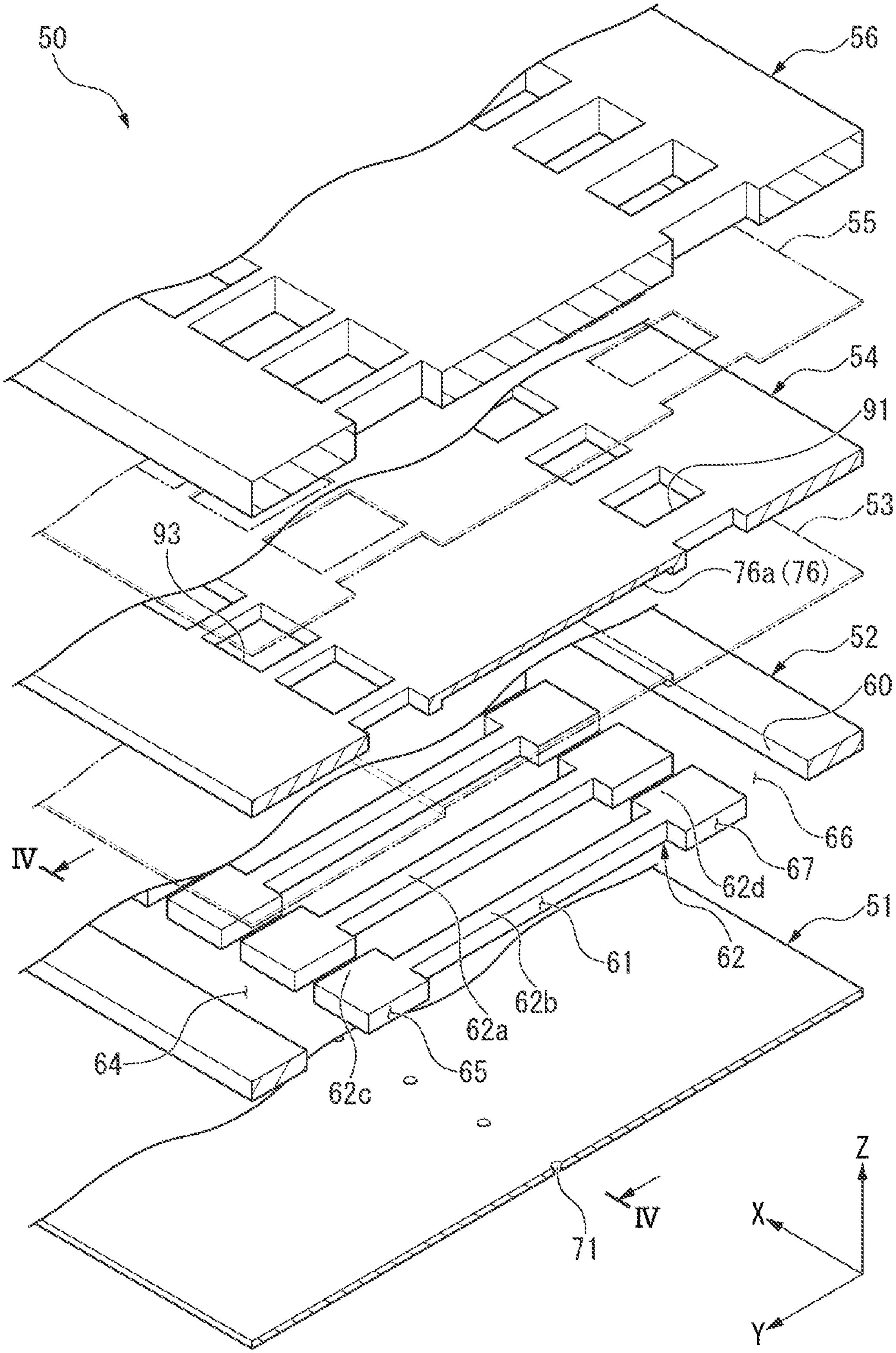
FIG. 3 is an exploded perspective view of a head chip according to the first embodiment.
Figure 4:
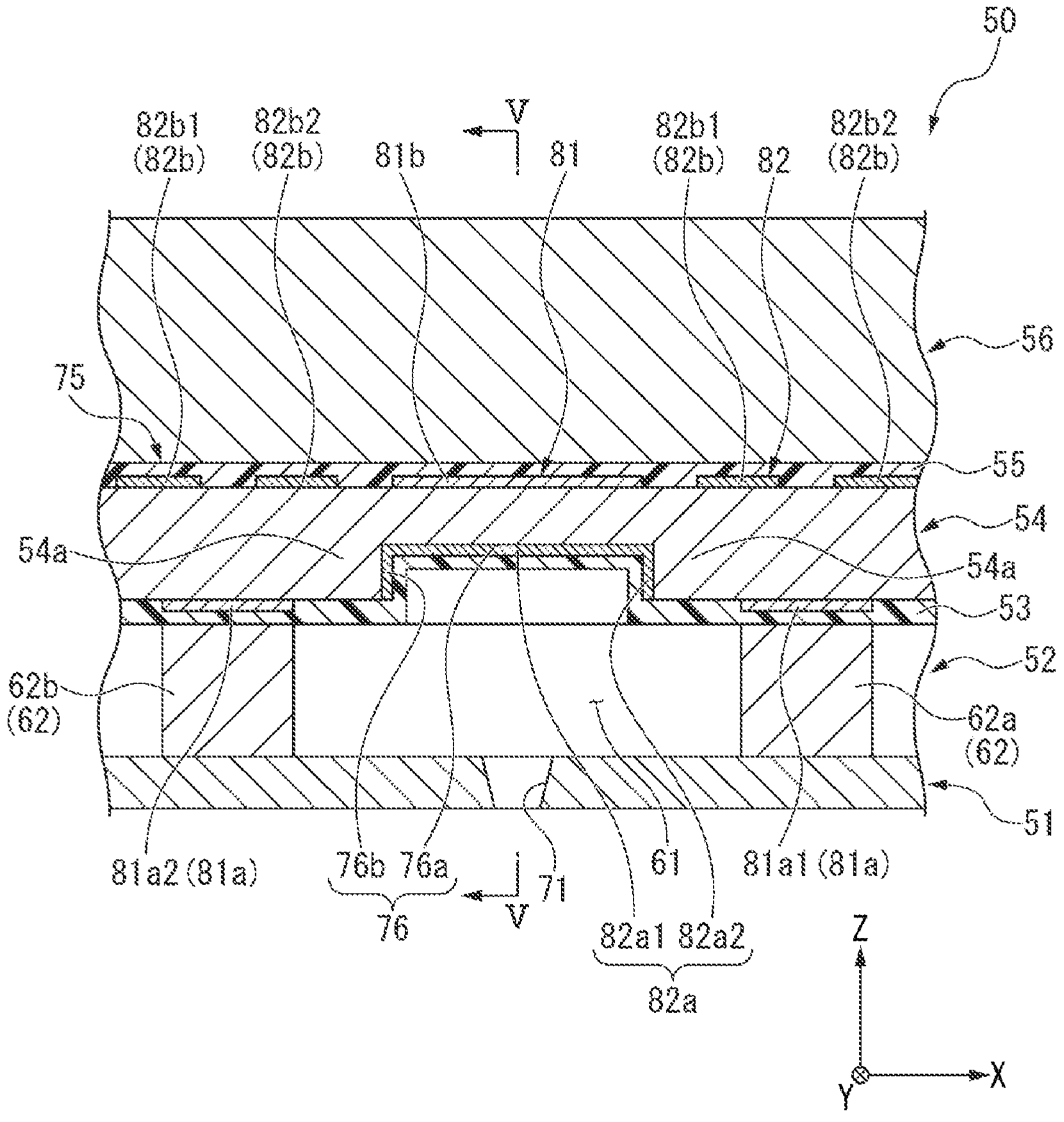
FIG. 4 is a cross-sectional view of the head chip corresponding to the line IV-IV shown in FIG. 3.
Figure 5:
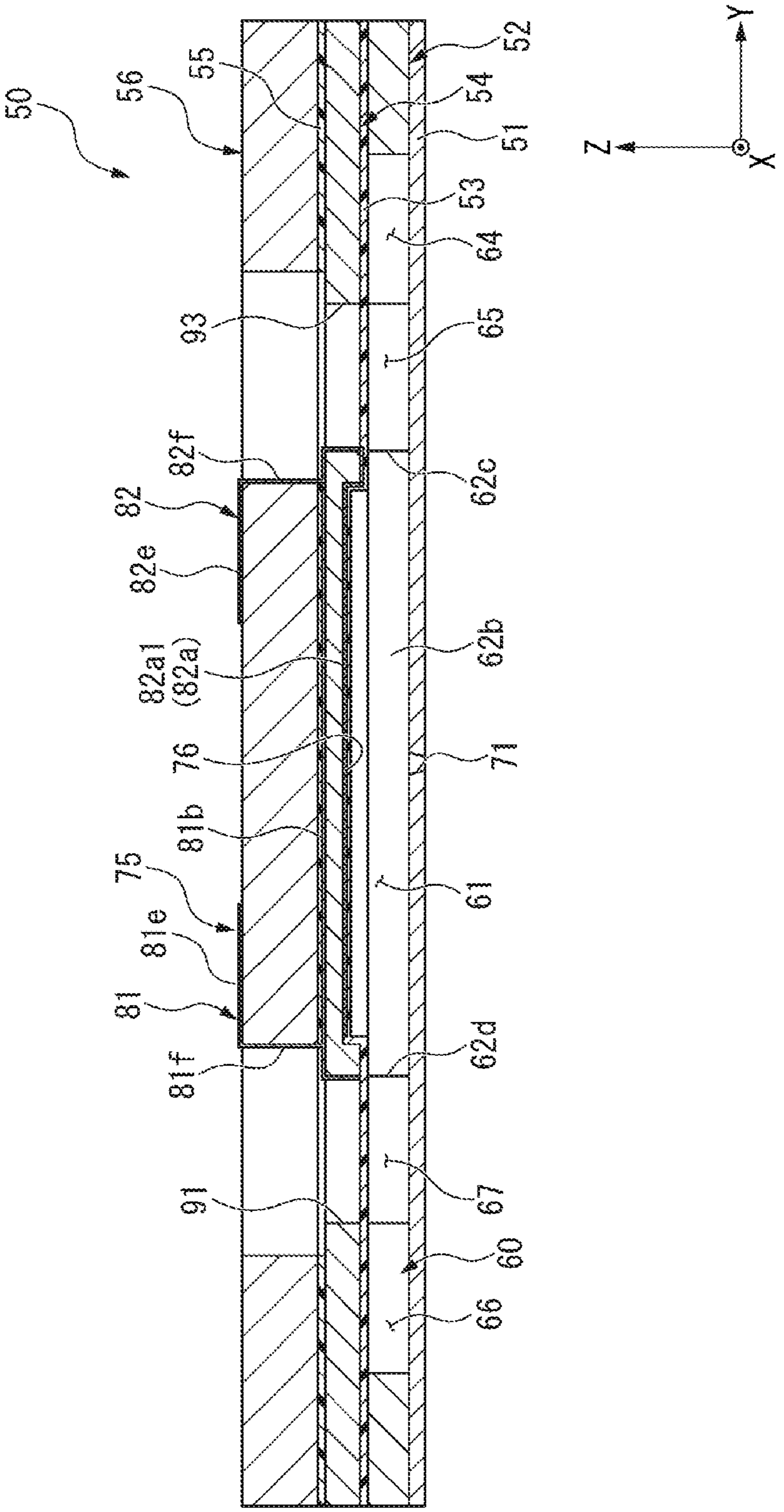
FIG. 5 is a cross-sectional view of the head chip corresponding to the line V-V shown in FIG. 4.

FIG. 3 is an exploded perspective view of the head chip 50. FIG. 4 is a cross-sectional view of the head chip 50 corresponding to the line IV-IV shown in FIG. 3. FIG. 5 is a cross-sectional view of the head chip 50 corresponding to the line V-V shown in FIG. 4.

The head chip 50 shown in FIG. 3 through FIG. 5 is a so-called recirculating side-shoot type head chip 50 which circulates the ink with the ink tank 4, and at the same time, ejects the ink from a central portion in the extending direction (the Y direction) in a pressure chamber 61 described later. The head chip 50 is provided with a nozzle plate 51, a flow channel member 52, a first film 53, an actuator plate 54, a second film 55, and a cover plate 56. In the following explanation, the description is presented in some cases defining a direction (+Z side) from the nozzle plate 51 toward the cover plate 56 along the Z direction as an upper side, and a direction (−Z side) from the cover plate 56 toward the nozzle plate 51 along the Z direction as a lower side.

The flow channel member 52 is shaped like a plate with the thickness direction set to the Z direction. The flow channel member 52 is formed of a material having ink resistance. As such a material, it is possible to adopt, for example, metal, metal oxide, glass, resin, and ceramics. The flow channel member 52 is provided with a flow channel 60 through which the ink circulates, and a plurality of pressure chambers 61 which is communicated with the flow channel 60, and which contains the ink. The flow channel 60 and the pressure chambers 61 penetrate the flow channel member 52 in the Z direction.

Figure 6:
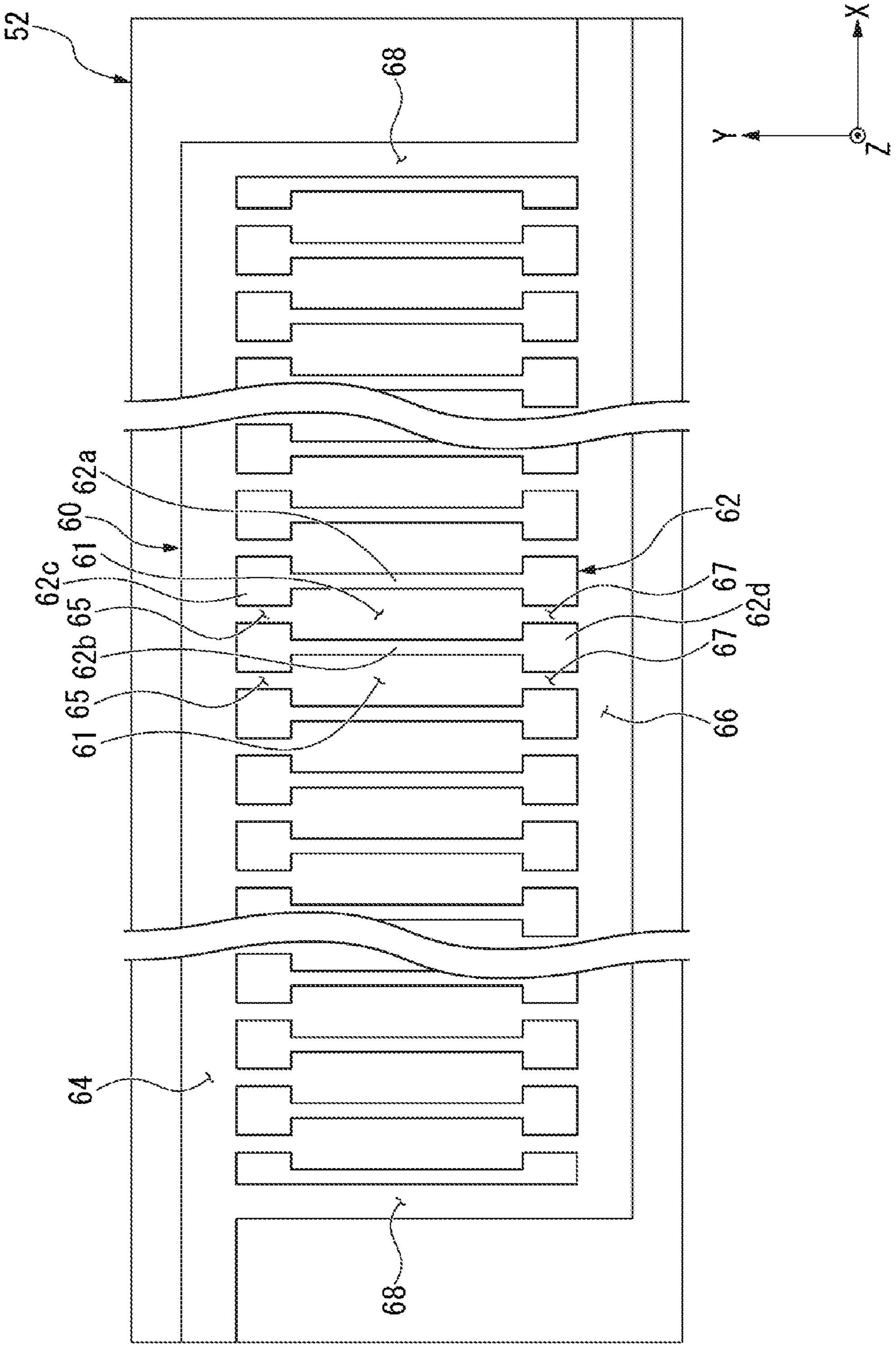
FIG. 6 is a plan view of a flow channel member related to the first embodiment.

FIG. 6 is a plan view of the flow channel member 52.

As shown in FIG. 6, the pressure chambers 61 are arranged side by side at intervals in the X direction. The pressure chambers 61 are each formed like a groove linearly extending in the Y direction. The pressure chambers 61 each penetrate the flow channel member 52 throughout the entire length in the Y direction. It should be noted that it is possible for the pressure chamber 61 to penetrate the flow channel member 52 in a part in the Y direction. It should be noted that the configuration in which the channel extension direction coincides with the Y direction will be described in the first embodiment, but the channel extension direction can cross the Y direction.

In the plan view, the pressure chambers 61 are partitioned by a partition wall 62. The partition wall 62 is provided with a pair of side walls 62*a*, 62*b* located at both sides in the X direction with respect to the pressure chamber 61, a +Y-side end wall 62*c* located at a +Y side with respect to the pressure chamber 61, and a −Y-side end wall 62*d* located at a −Y side with respect to the pressure chamber 61. The side walls 62*a*, 62*b* are each a portion of the flow channel member 52, the portion being located between the pressure chambers 61 adjacent to each other, and each partition the pressure chambers 61 adjacent to each other in the X direction. It should be noted that a planar shape of the pressure chamber 61 is not limited to a rectangular shape (a shape the longitudinal direction of which is set to either one of the X direction and the Y direction, and the short-side direction of which is set to the other thereof). The planar shape of the pressure chamber 61 can be a polygonal shape such as a square shape or a triangular shape, a circular shape, an elliptical shape, or the like.

The flow channel 60 includes an entrance-side common flow channel 64, entrance-side communication channels 65, an exit-side common flow channel 66, exit-side communication channels 67, and bypass channels 68.

The entrance-side common flow channel 64 extends in the X direction in a portion of the flow channel member 52, the portion being located at the +Y side of the pressure chambers 61. The entrance-side common flow channel 64 and each of the pressure chambers 61 are partitioned by the +Y-side end wall 62*c* of that pressure chamber 61. A −X-side end portion in the entrance-side common flow channel 64 is coupled to an entrance port (not shown). The entrance port is directly or indirectly coupled to the ink supply tube 21 (see FIG. 2). In other words, the ink flowing through the ink supply tube 21 is supplied to the entrance-side common flow channel 64 through the entrance port.

The entrance-side communication channels 65 are each branched toward the −Y side from a portion of the entrance-side common flow channel 64, the portion overlapping each of the pressure chambers 61 when viewed from the X direction to thereby connect the entrance-side common flow channel 64 and that pressure chamber 61 to each other. Specifically, each of the entrance-side communication channels 65 penetrates the +Y-side end wall 62*c* of corresponding one of the pressure chambers 61 in the Y direction. In the present embodiment, each of the entrance-side communication channels 65 is formed in a central portion in the X direction in the corresponding one of the +Y-side end walls 62*c* with a uniform depth throughout the entire length in the Y direction.

The exit-side common flow channel 66 extends in the X direction in a portion of the flow channel member 52, the portion being located at the −Y side with respect to each of the pressure chambers 61. The exit-side common flow channel 66 and each of the pressure chambers 61 are partitioned by the −Y-side end wall 62*d* of that pressure chamber 61. A +X-side end portion in the exit-side common flow channel 66 is coupled to an exit port (not shown). The exit port is directly or indirectly coupled to the ink discharge tube 22 (see FIG. 2). In other words, the ink flowing through the exit-side common flow channel 66 is supplied to the ink discharge tube 22 through the exit port.

The exit-side communication channels 67 are each branched toward the +Y side from a portion of the exit-side common flow channel 66, the portion overlapping each of the pressure chambers 61 when viewed from the X direction to thereby connect the exit-side common flow channel 66 and that pressure chamber 61 to each other. Specifically, each of the exit-side communication channels 67 penetrates the −Y-side end wall 62*d* of corresponding one of the pressure chambers 61 in the Y direction. In the present embodiment, each of the exit-side communication channels 67 is formed in a central portion in the X direction in corresponding one of the −Y-side end walls 62*d* with a uniform depth throughout the entire length in the Y direction. In the first embodiment, the width in the X direction in each of the communication channels 65, 67 is narrower than the width in the X direction in the pressure chamber 61. Thus, it is possible to ensure the distance between the pressure chambers 61 through the common flow channels 64, 66 in the pressure chambers 61 adjacent to each other. Therefore, it is possible to prevent so-called crosstalk that a pressure variation in one pressure chamber 61 is propagated to other pressure chambers 61 through the common flow channels 64, 66 and the communication channels 65, 67. Moreover, since the flow channel cross-sectional area of each of the communication channels 65, 67 becomes smaller than the flow channel cross-sectional area of the pressure chamber 61, it is easy to prevent the pressure variation from propagating from the common flow channels 64, 66 to the pressure chambers 61 through the communication channels 65, 67. It should be noted that the dimensions of the communication channels 65, 67 can arbitrarily be changed.

The bypass channels 68 couple +X-side end portions of the entrance-side common flow channel 64 and the exit-side common flow channel 66 to each other, and −X-side end portions of the entrance-side common flow channel 64 and the exit-side common flow channel 66 to each other, respectively.

As shown in FIG. 4 and FIG. 5, the nozzle plate 51 is fixed to the lower surface of the flow channel member 52 with bonding or the like. The nozzle plate 51 closes a lower end opening part of each of the flow channel 60 and the pressure chambers 61. In the first embodiment, the nozzle plate 51 is formed of a metal material such as SUS or Ni—Pd. It should be noted that it is possible for the nozzle plate 51 to have a single layer structure or a laminate structure with a resin material (e.g., polyimide), glass, silicone, or the like besides the metal material.

The nozzle plate 51 is provided with a plurality of nozzle holes 71 penetrating the nozzle plate 51 in the Z direction. The nozzle holes 71 are arranged at intervals in the X direction. The nozzle holes 71 are each communicated with corresponding one of the pressure chambers 61 in a central portion in the X direction and the Y direction. In the first embodiment, each of the nozzle holes 71 is formed to have, for example, a taper shape having an inner diameter gradually decreasing in a direction from the upper side toward the lower side. In the first embodiment, there is described the configuration in which the plurality of pressure chambers 61 and the plurality of nozzle holes 71 are aligned in the X direction, but this configuration is not a limitation. Defining the plurality of pressure chambers 61 and the plurality of nozzle holes 71 arranged in the X direction as a nozzle array, it is possible to dispose two or more nozzle arrays at intervals in the Y direction.

The first film 53 is fixed to an upper surface of the flow channel member 52 with bonding or the like. The first film 53 is arranged throughout the entire area of the upper surface of the flow channel member 52. Thus, the first film 53 closes an upper end opening part of each of the flow channel 60 and the pressure chambers 61. The first film 53 is formed of an elastically deformable material having an insulating property and ink resistance. As such a material, the first film 53 is formed of, for example, a resin material (a polyimide type, an epoxy type, a polypropylene type, and so on).

The actuator plate 54 is fixed to an upper surface of the first film 53 with bonding or the like with the thickness direction set to the Z direction. The actuator plate 54 is opposed to the pressure chambers 61 in the Z direction across the first film 53. It should be noted that the actuator plate 54 is not limited to the configuration of covering the pressure chambers 61 in a lump, but can individually be disposed for each of the pressure chambers 61.

The actuator plate 54 is formed of a piezoelectric material such as PZT (lead zirconate titanate). The actuator plate 54 is set so that the polarization direction faces to one direction toward the +Z side. On both surfaces of the actuator plate 54, there are formed drive interconnections 75. The actuator plate 54 is configured so as to be able to be deformed in the Z direction by an electric field being generated by a voltage applied by the drive interconnections 75. The actuator plate 54 expands or contracts the volume in the pressure chamber 61 due to the deformation in the Z direction to thereby eject the ink from the inside of the pressure chamber 61. It should be noted that the configuration of the drive interconnections 75 will be described later.

A recessed part (a shape changing part) 76 is formed in a portion of the actuator plate 54, the portion facing each of the pressure chambers 61. The recessed part 76 is recessed upward with respect to the lower surface (a first surface) of the actuator plate 54. Specifically, the recessed part 76 is formed in the portion located at the center in the X direction in the pressure chamber 61 in the plan view. The recessed part 76 is formed to have a rectangular shape viewed from the Y direction. It should be noted that in the illustrated example, a portion of the first film 53 described above, the portion corresponding to the recessed part 76, extends along the inner surface of the recessed part 76.

An opening width (a dimension in the X direction on the lower surface of the actuator plate 54) of the recessed part 76 is made uniform throughout the entire length in the Y direction. In the present embodiment, it is preferable for the opening width of the recessed part 76 to be set no lower than 20% and no higher than 80% of the width in the X direction in the pressure chamber 61. By setting the opening width to be no lower than 20%, it is possible to form the recessed part 76 having the width necessary to obtain a desired advantage irrespective of a production tolerance. By setting the opening width to be no higher than 80%, it is possible to ensure the distance between the recessed part 76 and the side walls 62*a*, 62*b* to thereby prevent a deterioration in rigidity of the head chip 50. It should be noted that it is possible to make the opening width of the recessed part 76 different in accordance with the position in the Y direction.

A maximum depth of the recessed part 76 is preferably set no lower than 20% and no higher than 80% with respect to the thickness of the actuator plate 54, and is more preferably set no lower than 50% and no higher than 70% with respect to the thickness of the actuator plate 54. Thus, it is possible to form the recessed part 76 having the depth necessary to obtain a desired advantage irrespective of the production tolerance. A length in the Y direction in the recessed part 76 is shorter than the length in the Y direction in the pressure chamber 61 (see FIG. 5). In the illustrated example, the depth of the recessed part 76 is uniform throughout the entire length in the Y direction. It should be noted that it is possible for both end portions in the Y direction in the recessed part 76 to gradually decrease in depth in directions toward outer sides in the Y direction. Further, the length in the Y direction in the recessed part 76 can be no shorter than the length in the Y direction in the pressure chamber 61.

The second film 55 is fixed to an upper surface of the actuator plate 54 with bonding or the like. In the first embodiment, the second film 55 covers the entire area of the upper surface of the actuator plate 54. The second film 55 is formed of an elastically deformable material having an insulating property. As such a material, it is possible to adopt substantially the same material as that of the first film 53. It should be noted that the second film 55 is not an essential constituent. It is possible for the actuator plate 54 and the cover plate 56 to be bonded to each other via an adhesive layer including, for example, an epoxy adhesive or an acrylic adhesive.

The cover plate 56 is fixed to an upper surface of the second film 55 with bonding or the like with the thickness direction set to the Z direction. The cover plate 56 is thicker in thickness in the Z direction than the actuator plate 54, the flow channel member 52, and the films 53, 55. In the first embodiment, the cover plate 56 is formed of a material (e.g., metal oxide, glass, resin, or ceramics) having an insulating property.

Figure 7:
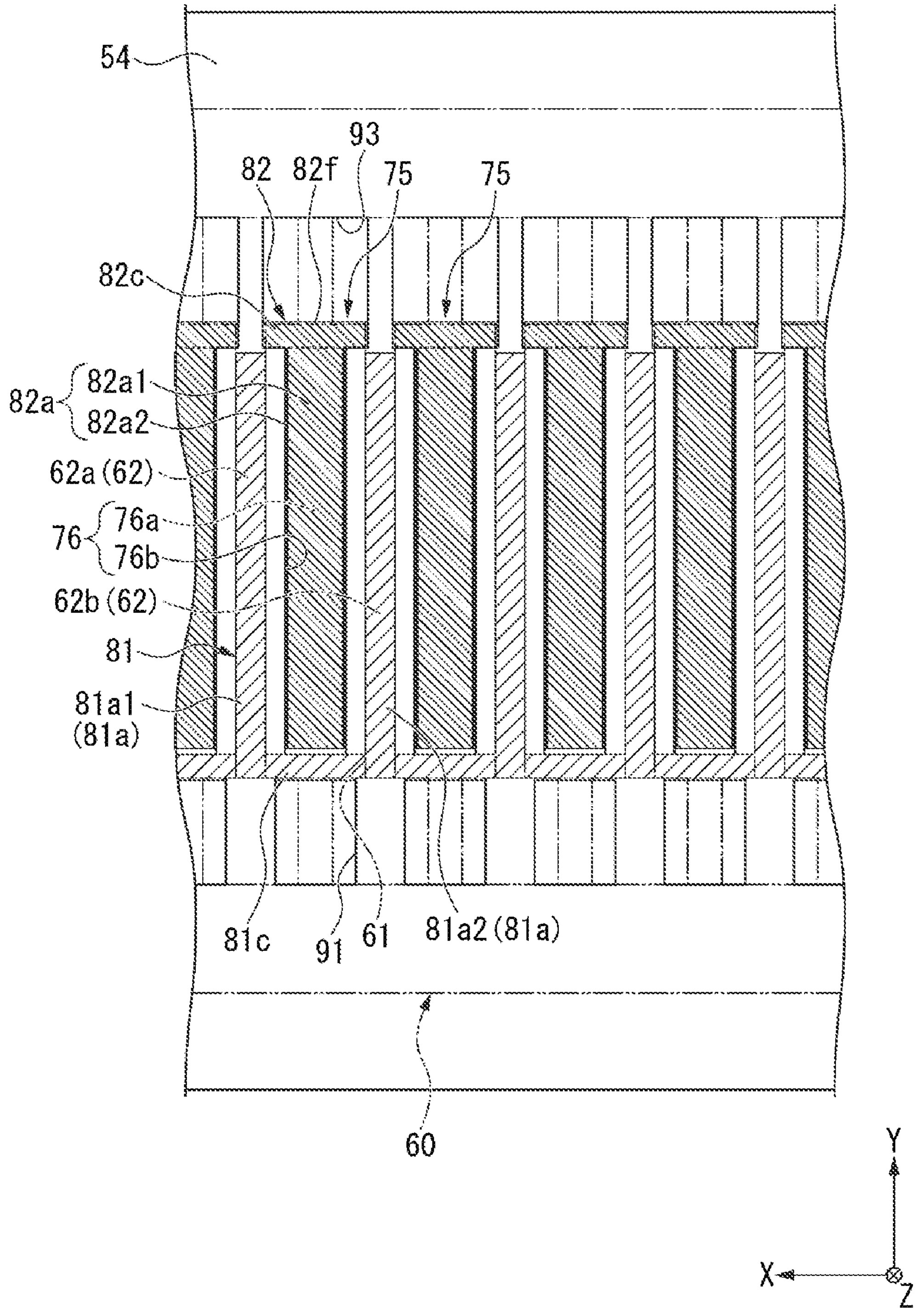
FIG. 7 is a bottom view of an actuator plate related to the first embodiment.
Figure 8:
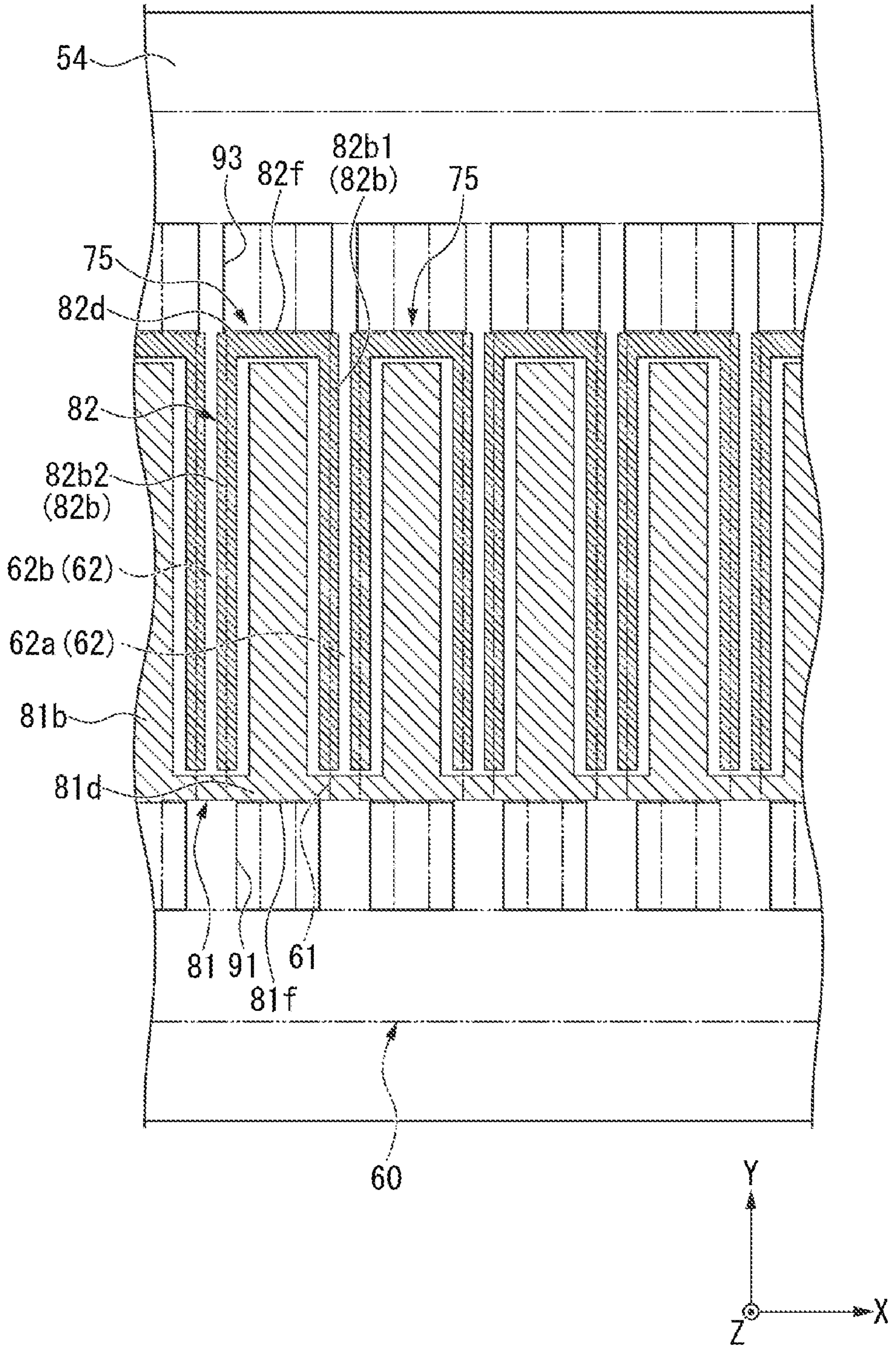
FIG. 8 is a plan view of the actuator plate related to the first embodiment.

Subsequently, a structure of the drive interconnections 75 will be described. FIG. 7 is a bottom view of the actuator plate 54. FIG. 8 is a plan view of the actuator plate 54. The drive interconnections 75 are disposed so as to correspond to the pressure chambers 61. The drive interconnections 75 corresponding to the pressure chambers 61 adjacent to each other have respective configurations substantially the same as each other. In the following explanation, the drive interconnections 75 disposed so as to correspond to one pressure chamber 61 out of the plurality of pressure chambers 61 are described as an example, and the description of the drive interconnections 75 corresponding to the other pressure chambers 61 will arbitrarily be omitted.

As shown in FIG. 7 and FIG. 8, the drive interconnections 75 consist of a common interconnection 81 and an individual interconnection 82.

The common interconnection 81 is provided with a first common electrode 81*a*, second common electrodes 81*b*, a lower-surface patterned interconnection 81*c*, an upper-surface patterned interconnection 81*d*, a common pad 81*e*, and a through interconnection 81*f*.

As shown in FIG. 4 and FIG. 7, the first common electrodes 81*a* are formed at positions overlapping the respective side walls 62*a*, 62*b* when viewed from the Z direction on a lower surface of the actuator plate 54. Specifically, in the first common electrodes 81*a*, the whole of the first common electrode 81*a* (hereinafter referred to as a +X-side common electrode 81*a*1) located at the +X side overlaps the side wall 62*a* when viewed from the Z direction. In contrast, in the first common electrodes 81*a*, the whole of the first common electrode 81*a* (hereinafter referred to as a −X-side common electrode 81*a*2) located at the −X side overlaps the side wall 62*b* when viewed from the Z direction. The first common electrodes 81*a* linearly extend in the Y direction with a length equivalent to the length of the pressure chamber 61. In the present embodiment, the +X-side common electrode 81*a*1 corresponding to one pressure chamber 61 is also used as the −X-side common electrode 81*a*2 of another pressure chamber 61 adjacent at the +X side to the one pressure chamber 61. In contrast, the −X-side common electrode 81*a*2 corresponding to one pressure chamber 61 is also used as the +X-side common electrode 81*a*1 of another pressure chamber 61 adjacent at the −X side to the one pressure chamber 61. It should be noted that between the pressure chambers 61, the common electrodes 81*a*1, 81*a*2 can be separated from each other.

As shown in FIG. 4 and FIG. 8, the second common electrode 81*b* is arranged at a position which overlaps corresponding one of the pressure chambers 61 when viewed from the Z direction, and which fails to overlap the first common electrode 81*a* when viewed from the Z direction on the upper surface (a second surface) of the actuator plate 54. In the illustrated example, the second common electrode 81*b* is formed in a region including a central portion in the X direction in the pressure chamber 61. The second common electrode 81*b* linearly extends in the Y direction with a length equivalent to the length of the pressure chamber 61.

As shown in FIG. 4 and FIG. 7, the lower-surface patterned interconnection 81*c* is coupled to the first common electrodes 81*a* in a lump on the lower surface of the actuator plate 54. The lower-surface patterned interconnection 81*c* extends in the X direction in a state of being coupled to the −Y-side end portion in each of the first common electrodes 81*a*.

As shown in FIG. 4 and FIG. 8, the upper-surface patterned interconnection 81*d* is coupled to the second common electrode 81*b* on the upper surface of the actuator plate 54. The upper-surface patterned interconnection 81*d* extends in the X direction in a state of being coupled to the −Y-side end portion in the second common electrodes 81*b*.

Figure 9:
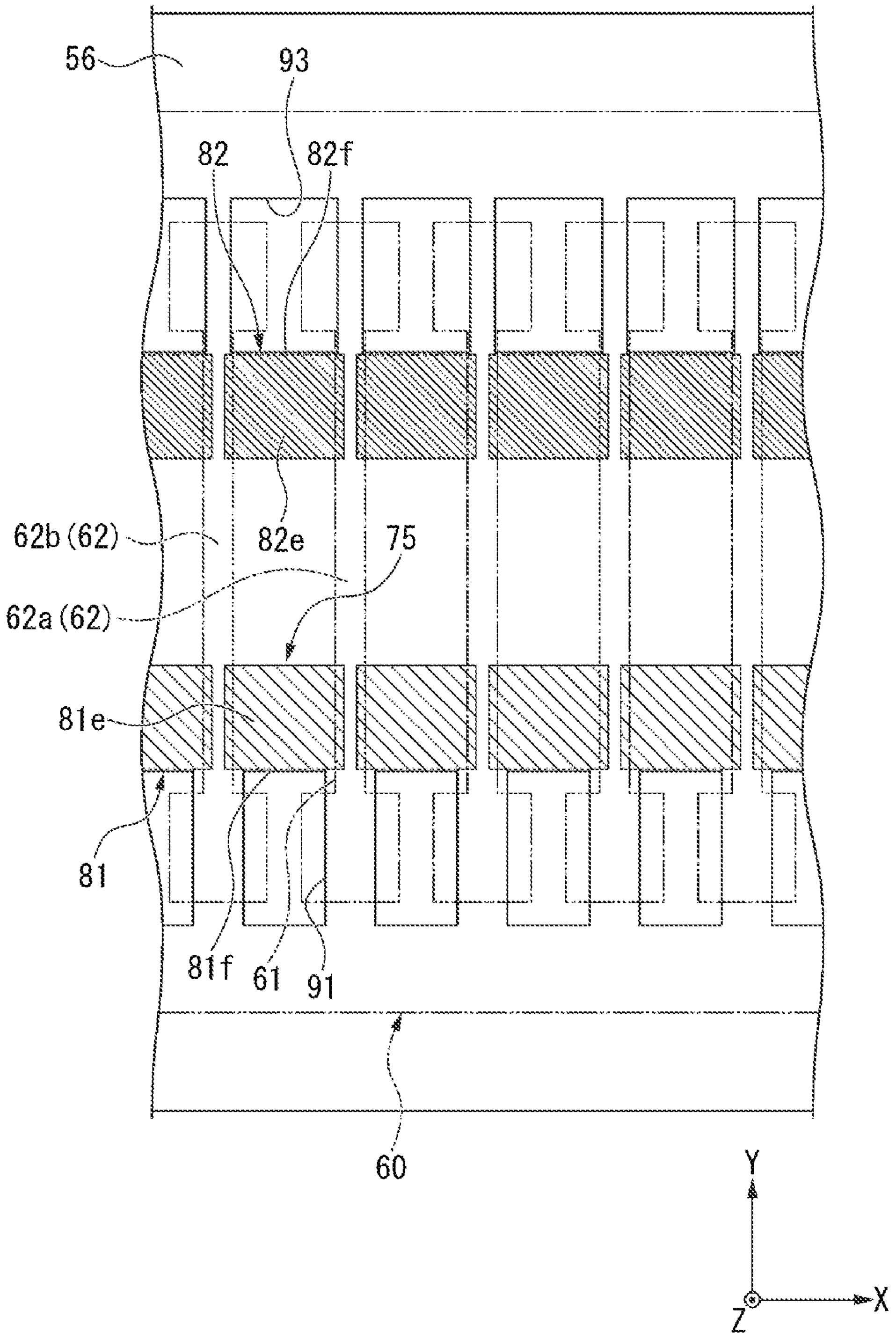
FIG. 9 is a plan view of a cover plate related to the first embodiment.

As shown in FIG. 5 and FIG. 9, the common pad 81*e* is formed on the upper surface of the cover plate 56. The common pad 81*e* extends in the Y direction on a portion of the upper surface of the cover plate 56, the portion overlapping the pressure chamber 61 when viewed from the Z direction.

The through interconnection 81*f* connects the lower-surface patterned interconnection 81*c*, the upper-surface patterned interconnection 81*d* and the common pad 81*e* to each other. The through interconnection 81*f* is disposed so as to penetrate the actuator plate 54, the second film 55, and the cover plate 56 in the Z direction. Specifically, a common interconnecting hole 91 is formed in a portion of the actuator plate 54, the second film 55, and the cover plate 56, the portion being located at the −Y side with respect to the patterned interconnections 81*c*, 81*d*. The common interconnecting hole 91 is individually formed for each of the pressure chambers 61. A −Y-side end edge in each of the lower-surface patterned interconnection 81*c*, the upper-surface patterned interconnection 81*d*, and the common pad 81*e* is coupled to the through interconnection 81*f* in an opening edge of the common interconnecting hole 91. It should be noted that the through interconnection 81*f* and the common interconnecting hole 91 can be disposed in a lump to the pressure chambers 61. In this case, the common interconnecting hole 91 extends in the X direction with the length sufficient to straddle the pressure chambers 61.

As shown in FIG. 7 and FIG. 8, the individual interconnection 82 is provided with a first individual electrode 82*a*, a second individual electrode 82*b*, a lower-surface patterned interconnection 82*c*, an upper-surface patterned interconnection 82*d*, an individual pad 82*e*, and a through interconnection 82*f*.

As shown in FIG. 4 and FIG. 7, the first individual electrode 82*a* generates a potential difference from the first common electrode 81*a*, and at the same time, generates a potential difference from the second common electrode 81*b*. At least a part of the first individual electrode 82*a* overlaps the second common electrode 81*b* when viewed from the Z direction. The first individual electrode 82*a* extends in the Y direction in a state at a distance in the X direction from each of the first common electrodes 81*a*.

The first individual electrode 82*a* is formed on at least an inner surface of the recessed part 76. Specifically, the first individual electrode 82*a* is provided with a bottom-surface electrode 82*a*1 and side-surface electrodes 82*a*2.

The bottom-surface electrode 82*a*1 is formed throughout the entire area of the bottom surface 76*a* (a surface facing downward) of the recessed part 76.

The side-surface electrode 82*a*2 is formed throughout the entire area on each of a pair of inner side surfaces 76*b* opposed in the X direction to each other out of the inner surfaces of the recessed part 76. An upper end edge of each of the side-surface electrodes 82*a*2 is coupled to the bottom-surface electrode 82*a*1. It should be noted that it is sufficient for the first individual electrode 82*a* to be formed on at least a part of the inner surfaces of the recessed part 76. Further, the first individual electrode 82*a* can be connected to a portion of the lower surface of the actuator plate 54, the portion being located on the periphery of the recessed part 76 in addition to the inner surfaces of the recessed part 76.

As shown in FIG. 4 and FIG. 8, the second individual electrode 82*b* generates a potential difference from the second common electrode 81*b*, and at the same time, generates a potential difference from the first common electrode 81*a*. The second individual electrodes 82*b* are respectively formed in portions located at both sides in the X direction with respect to the second common electrode 81*b* on the upper surface of the actuator plate 54. The second individual electrodes 82*b* each extend in the Y direction in a state at a distance in the X direction from the second common electrode 81*b*. The width in the X direction in the second individual electrode 82*b* is narrower than the width in the X direction in the first common electrodes 81*a*.

As shown in FIG. 4 and FIG. 8, out of the second individual electrodes 82*b*, the second individual electrode 82*b* (hereinafter referred to as a +X-side individual electrode 82*b*1) located at the +X side generates a potential difference from the +X-side common electrode 81*a*1. A part of the +X-side individual electrode 82*b*1 overlaps the side wall 62*a* when viewed from the Z direction. The +X-side individual electrode 82*b*1 is opposed to the +X-side common electrode 81*a*1 in the Z direction on the side wall 62*a*.

Out of the second individual electrodes 82*b*, the second individual electrode 82*b* (hereinafter referred to as a −X-side individual electrode 82*b*2) located at the −X side generates a potential difference from the −X-side common electrode 81*a*2. A part of the −X-side individual electrode 82*b*2 overlaps the side wall 62*b* when viewed from the Z direction. The −X-side individual electrode 82*b*2 is opposed to the −X-side common electrode 81*a*2 in the Z direction on the side wall 62*b*. A remaining part of the −X-side individual electrode 82*b*2 runs off toward the +X side with respect to the side wall 62*b*. It should be noted that between the pressure chambers 61 adjacent to each other, the +X-side individual electrode 82*b*1 in one pressure chamber 61 and the −X-side individual electrode 82*b*2 in the other pressure chamber 61 are at a distance in the X direction from each other on the side walls 62*a*, 62*b*.

As shown in FIG. 7, the lower-surface patterned interconnection 82*c* is coupled to the first individual electrode 82*a* on the lower surface of the actuator plate 54. The lower-surface patterned interconnection 82*c* extends from the +Y-side end portion in the first individual electrode 82*a* toward both sides in the X direction. The lower-surface patterned interconnections 82*c* corresponding to the pressure chambers 61 adjacent to each other are separated from each other.

As shown in FIG. 8, the upper-surface patterned interconnection 82*d* couples the +Y-side end portions of the respective second individual electrodes 82*b* to each other on the upper surface of the actuator plate 54.

As shown in FIG. 9, the individual pads 82*e* are formed on the upper surface of the cover plate 56. The individual pads 82*e* each extend in the Y direction on a portion of the upper surface of the cover plate 56, the portion overlapping the pressure chamber 61 when viewed from the Z direction.

As shown in FIG. 4, FIG. 7, and FIG. 8, the through interconnection 82*f* couples the lower-surface patterned interconnection 82*c*, the upper-surface patterned interconnection 82*d*, and the individual pad 82*e*, which are in a corresponding relation, to each other. The through interconnection 82*f* is disposed so as to penetrate the actuator plate 54 in the Z direction. Specifically, an individual interconnecting hole 93 is formed in a portion of the actuator plate 54, the second film 55, and the cover plate 56, the portion being located at the +Y side with respect to the first individual electrode 82*a*. The individual interconnecting hole 93 is individually formed for each of the pressure chambers 61. A +Y-side end edge in each of the lower-surface patterned interconnection 82*c*, the upper-surface patterned interconnection 82*d*, and the individual pad 82*e* corresponding to each other is coupled to the through interconnection 82*f* in an opening edge of the individual interconnecting hole 93. It should be noted that the individual interconnecting hole 93 can be disposed in a lump to the pressure chambers 61. In this case, the individual interconnecting hole 93 extends in the X direction with the length sufficient to straddle the pressure chambers 61.

As shown in FIG. 4, in the drive interconnections 75, a portion opposed to the flow channel member 52 is covered with the first film 53. Specifically, in the drive interconnections 75, the first common electrodes 81*a*, the first individual electrodes 82*a*, the lower-surface patterned interconnections 81*c*, 82*c*, and the through interconnections 81*f*, 82*f* are covered with the first film 53. In contrast, in the drive interconnection 75, a portion formed on the upper surface of the actuator plate 54 is covered with the second film 55. Specifically, in the drive interconnections 75, the second common electrodes 81*b*, the second individual electrodes 82*b*, the upper-surface patterned interconnections 81*d*, 82*d*, and the through interconnections 81*f*, 82*f* are covered with the second film 55.

To the upper surface of the cover plate 56, there is pressure-bonded a flexible printed board (not shown). The flexible printed board is mounted on the common pads 81*e* and the individual pads 82*e* on the upper surface of the cover plate 56.

[Operation Method of Printer 1]

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the pressure chambers 61 through the entrance-side common flow channel 64 and the entrance-side communication channels 65. The ink supplied to the inside of each of the pressure chambers 61 circulates through that pressure chamber 61 in the Y direction. Subsequently, the ink is discharged to the exit-side common flow channel 66 through the exit-side communication channels 67, and is then returned to the ink tank 4 through the ink discharge tube 22. Thus, it is possible to circulate the ink between the inkjet head 5 and the ink tank 4.

Then, when the reciprocation of the inkjet heads 5 is started due to the translation of the carriage 29 (see FIG. 1), the drive voltages are applied between the common electrodes 81*a*, 81*b* and the individual electrodes 82*a*, 82*b* via the flexible printed boards. On this occasion, the common electrodes 81*a*, 81*b* are set at a reference potential GND, and the individual electrodes 82*a*, 82*b* are set at a drive potential Vdd to apply the drive voltage.

Figure 10:
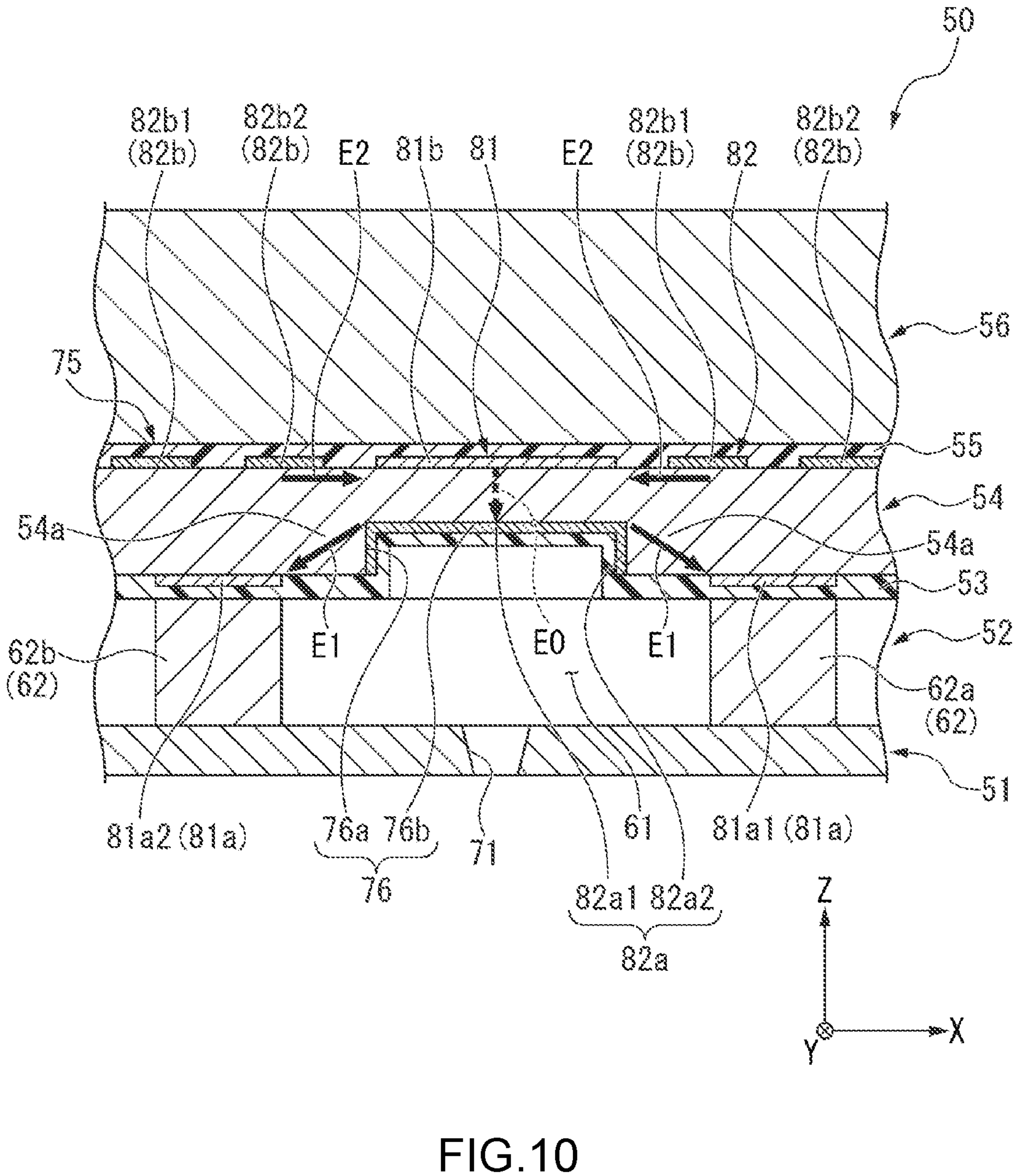
FIG. 10 is an explanatory diagram for explaining a behavior of deformation when ejecting ink regarding the head chip according to the first embodiment.

FIG. 10 is an explanatory diagram for explaining a behavior of deformation when ejecting the ink regarding the head chip 50.

As shown in FIG. 10, due to the application of the drive voltage, the potential difference occurs in the X direction between the first common electrodes 81*a* and the first individual electrode 82*a*, and between the second common electrode 81*b* and the second individual electrodes 82*b*. Due to the potential difference generated in the X direction, the thickness-shear deformation occurs in the actuator plate 54 in the Z direction in the shear mode. Specifically, between the first common electrodes 81*a* and the first individual electrode 82*a*, there occurs the electric field in a direction of getting away from each other in the X direction (see the arrows E1). Further, on the upper surface of the actuator plate 54, between the second common electrode 81*b* and the second individual electrodes 82*b*, there occurs the electric field in a direction of coming closer to each other in the X direction (see the arrows E2). As a result, in the actuator plate 54, a shear deformation occurs upward in a direction from the both end portions toward the central portion in the X direction in a portion corresponding to each of the pressure chambers 61. In particular, in the present embodiment, since the side-surface electrode 82*a*2 is formed on the inner side surface 76*b* of the recessed part 76, the electric field is generated in a state of facing downward in a direction toward the outside in the X direction due to the potential difference generated between the side-surface electrode 82*a*2 and the first common electrode 81*a*. Therefore, a portion (hereinafter referred to as a deformation facilitating part 54*a*) of the actuator plate 54, the portion being located at an outer side in the X direction with respect to the recessed part 76, is apt to deform so as to rise upward from each of the side walls 62*a*, 62*b*.

Meanwhile, the potential difference occurs in the Z direction between the first common electrodes 81*a* and the second individual electrodes 82*b*, and between the first individual electrode 82*a* and the second common electrode 81*b*. Due to the potential difference having occurred in the Z direction, an electric field occurs (see the arrow E0) in the actuator plate 54 in a direction parallel to the polarization direction (the Z direction). As a result, a stretch deformation occurs in the actuator plate 54 in the Z direction in a bend mode. In other words, in the head chip 50 according to the first embodiment, it results in that both of the deformation caused by the shear mode and the deformation caused by the bend mode in the actuator plate 54 occur in the Z direction. Specifically, due to the application of the drive voltage, the actuator plate 54 deforms in a direction of getting away from the pressure chamber 61. Thus, the volume in the pressure chamber 61 increases. Subsequently, when making the drive voltage zero, the actuator plate 54 is restored to thereby urge the volume in the pressure chamber 61 to be restored. In the process in which the actuator plate 54 is restored, the pressure in the pressure chamber 61 increases, and thus, the ink in the pressure chamber 61 is ejected outside through the nozzle hole 71. By the ink ejected outside landing on the recording target medium P, print information is recorded on the recording target medium P.

<Method of Manufacturing Head Chip 50>

Figure 11:
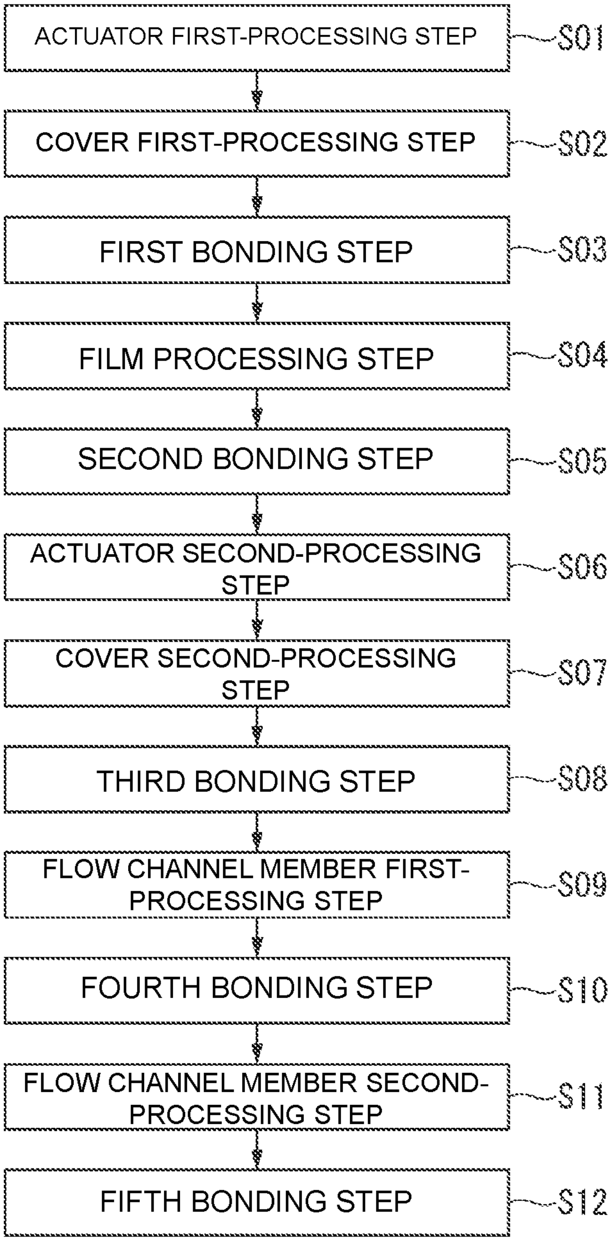
FIG. 11 is a flowchart for explaining a method of manufacturing the head chip according to the first embodiment.

Then, a method of manufacturing the head chip 50 described above will be explained. FIG. 11 is a flowchart for explaining the method of manufacturing the head chip 50. FIG. 12 through FIG. 24 are each a process diagram for explaining the method of manufacturing the head chip 50, and are each a cross-sectional view corresponding to FIG. 4 and FIG. 5. In the following description, there is described when manufacturing the head chip 50 chip by chip as an example for the sake of convenience.

As shown in FIG. 11, the method of manufacturing the head chip 50 is provided with an actuator first-processing step S01, a cover first-processing step S02, a first bonding step S03, a film processing step S04, a second bonding step S05, an actuator second-processing step S06, a cover second-processing step S07, a third bonding step S08, a flow channel member first-processing step S09, a fourth bonding step S10, a flow channel member second-processing step S11, and a fifth bonding step S12.

Figure 12:
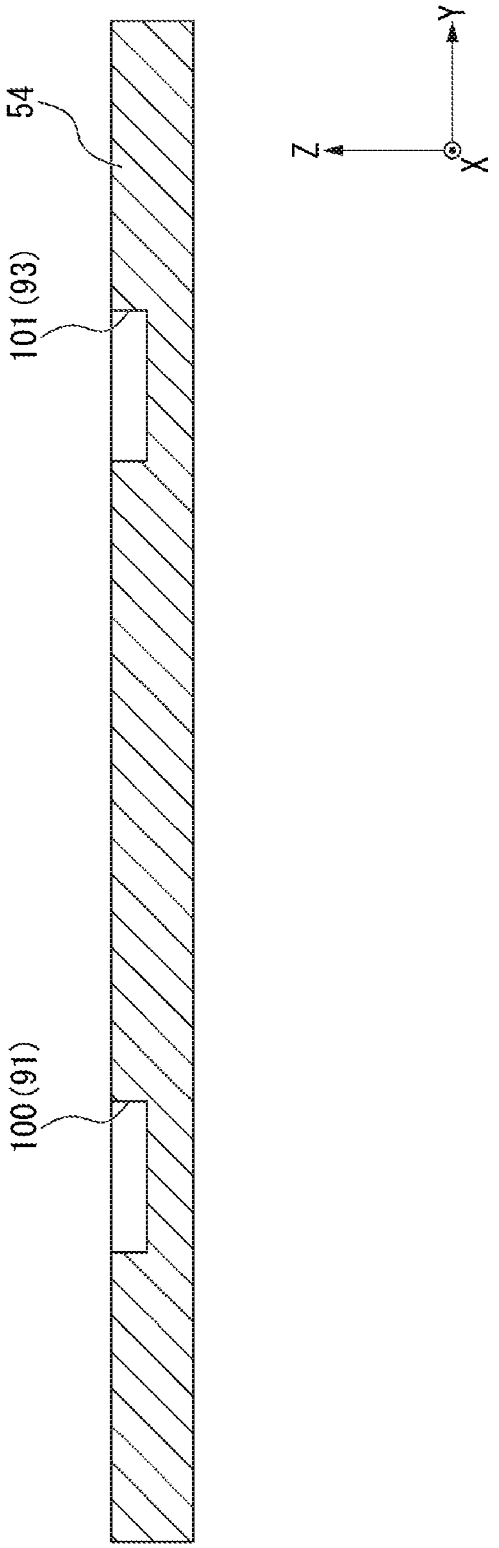
FIG. 12 is a process chart for explaining the method of manufacturing the head chip according to the first embodiment, and is a cross-sectional view corresponding to FIG. 5.

As shown in FIG. 12, in the actuator first-processing step S01, first, recessed parts 100, 101 which turn to a part of the common interconnecting hole 91 and a part of the individual interconnecting hole 93 are formed (a recessed part formation step). Specifically, a mask pattern in which formation areas of the common interconnecting hole 91 and the individual interconnecting hole 93 open is formed on the upper surface of the actuator plate 54. Subsequently, sandblasting and so on are performed on the upper surface of the actuator plate 54 through the mask pattern. Thus, the recessed parts 100, 101 recessed from the upper surface are provided to the actuator plate 54. It should be noted that the recessed parts 100, 101 can be formed by dicer processing, precision drill processing, etching processing, or the like.

Figure 13:
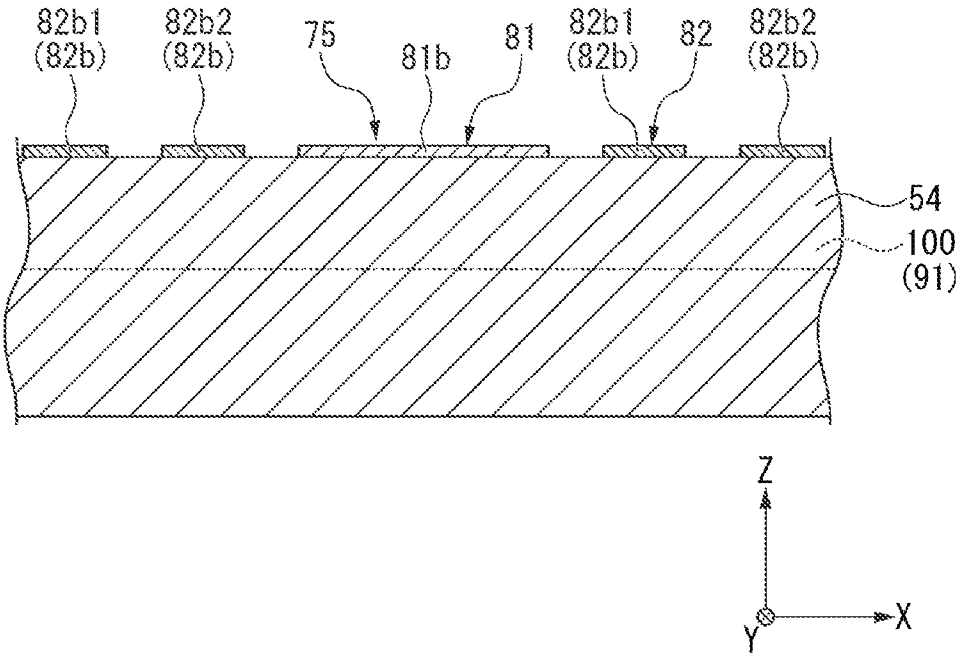
FIG. 13 is a process chart for explaining the method of manufacturing the head chip according to the first embodiment, and is a cross-sectional view corresponding to FIG. 4.

Then, as shown in FIG. 13, in the actuator first-processing step S01, there are formed portions of the drive interconnections 75, the portions being located on the upper surface of the actuator plate 54 (a first interconnection formation step). In the first interconnection formation step, first, a mask pattern in which formation areas of the drive interconnections 75 open is formed on the upper surface of the actuator plate 54. Then, an electrode material is deposited on the actuator plate 54 using, for example, vapor deposition. The electrode material is deposited on the actuator plate 54 through the opening parts of the mask pattern. Thus, the drive interconnections 75 are formed on the upper surface of the actuator plate 54, and the inner surfaces of the recessed parts 100, 101.

Figure 14:
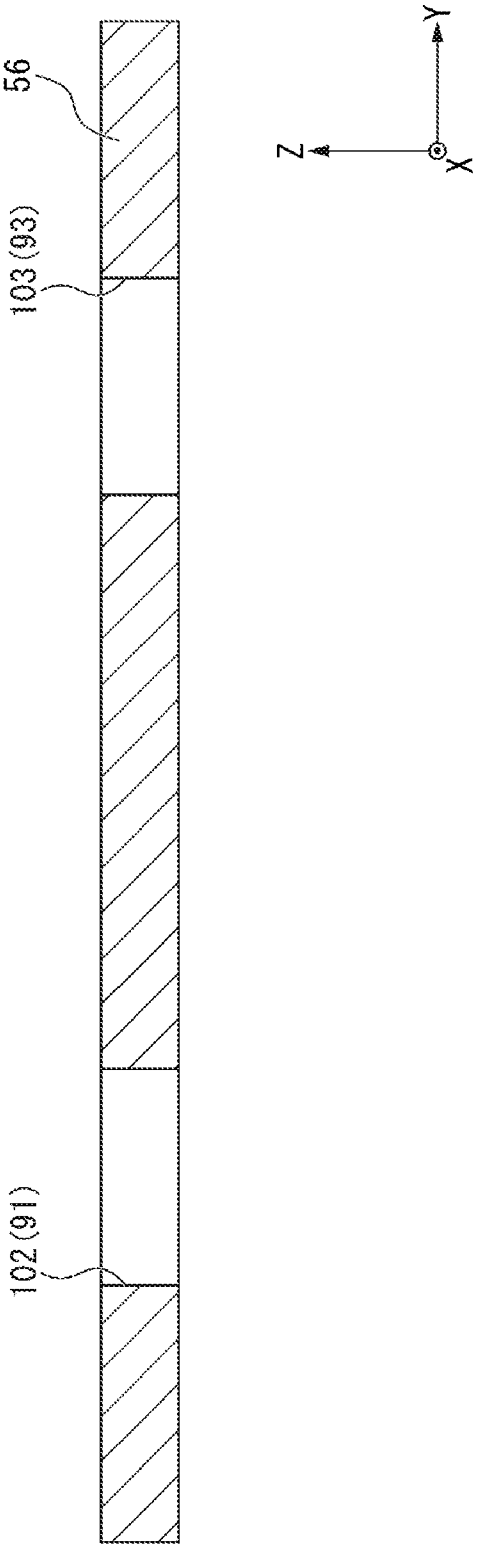
FIG. 14 is a process chart for explaining the method of manufacturing the head chip according to the first embodiment, and is a cross-sectional view corresponding to FIG. 5.

As shown in FIG. 14, in the cover first-processing step S02, through holes 102, 103 which turn to a part of the common interconnecting hole 91 and a part of the individual interconnecting hole 93 are provided to the cover plate 56. The through holes 102, 103 can be formed by the sandblasting, the dicer processing, or the like similarly to the method of providing the recessed parts 100, 101 to the actuator plate 54.

Figure 15:
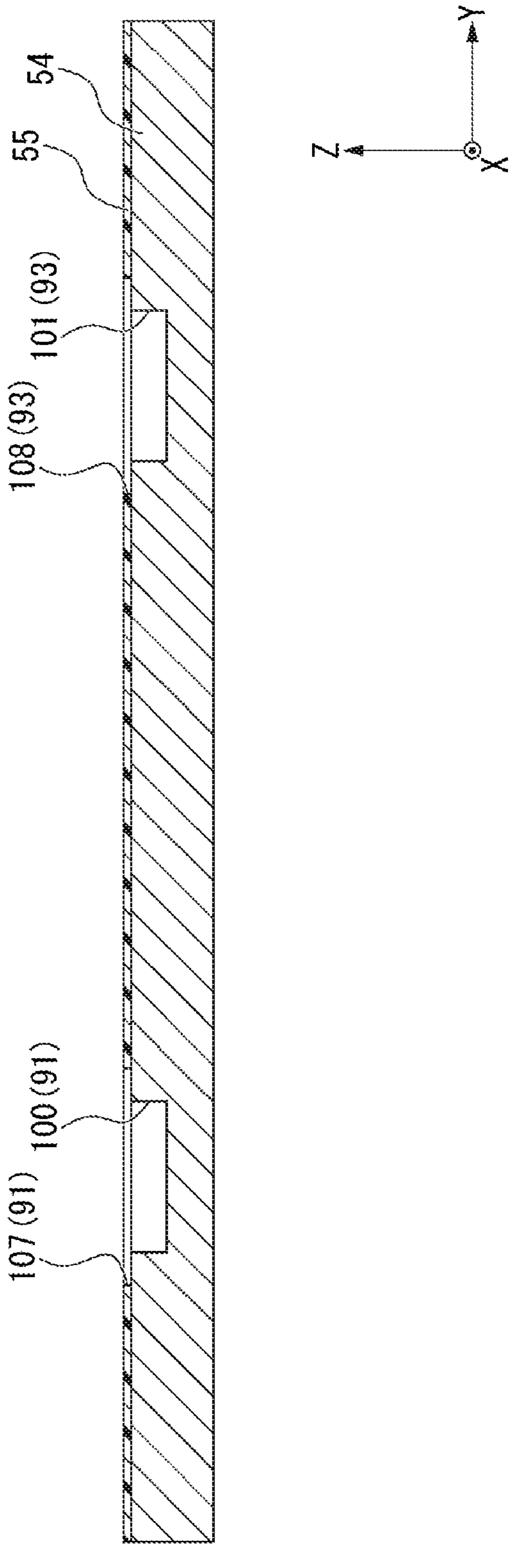
FIG. 15 is a process chart for explaining the method of manufacturing the head chip according to the first embodiment, and is a cross-sectional view corresponding to FIG. 5.

As shown in FIG. 15, in the first bonding step S03, the second film 55 is attached to the upper surface of the actuator plate 54 with an adhesive or the like.

In the film processing step S04, through holes 107, 108 which turn to a part of the common interconnecting hole 91 and a part of the individual interconnecting hole 93 are formed. It is possible to form the through holes 107, 108 by performing, for example, laser processing on portions of the second film 55, the portions overlapping the corresponding recessed parts 100, 101 when viewed from the Z direction. Thus, the recessed parts 100 and the through holes 107 are communicated with each other, and the recessed parts 101 and the through holes 108 are communicated with each other.

Figure 16:
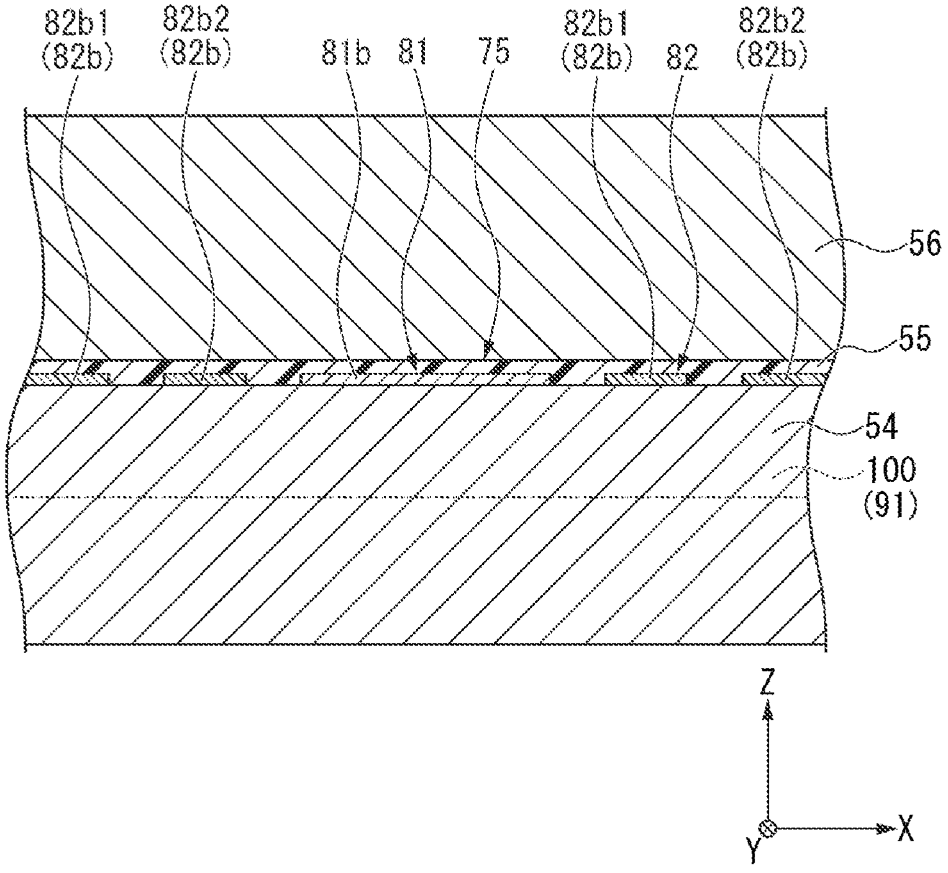
FIG. 16 is a process chart for explaining the method of manufacturing the head chip according to the first embodiment, and is a cross-sectional view corresponding to FIG. 4.

As shown in FIG. 16, in the second bonding step S05, the cover plate 56 is attached to the upper surface of the second film 55 with an adhesive or the like. Thus, the recessed parts 100 and the through holes 102, 107 are communicated with each other, and the recessed parts 101 and the through holes 103, 108 are communicated with each other.

Figure 17:
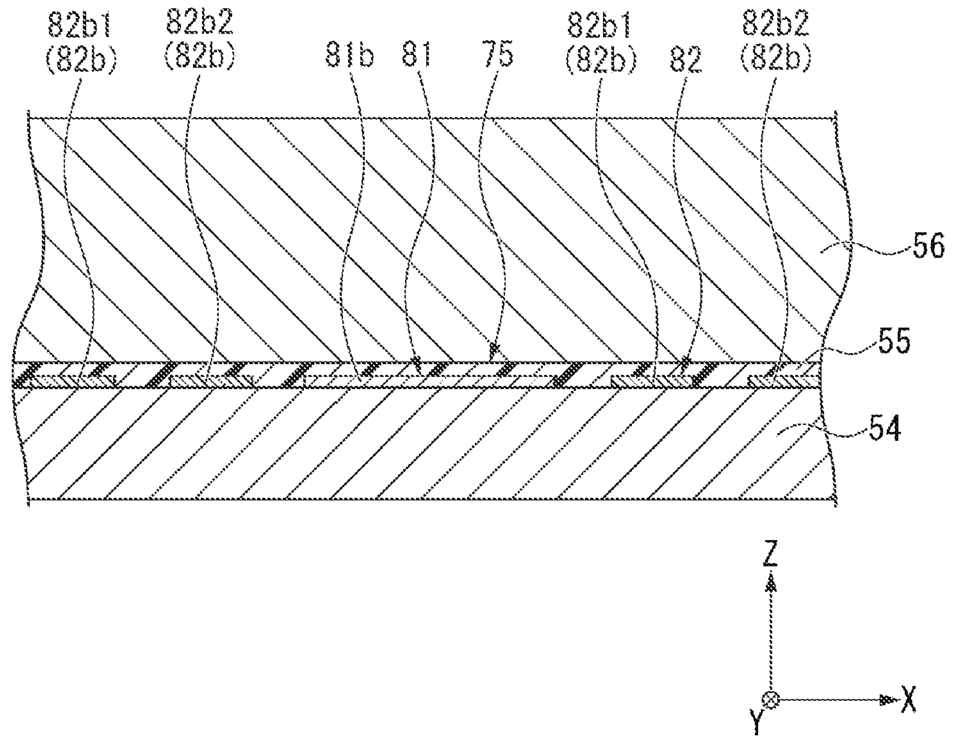
FIG. 17 is a process chart for explaining the method of manufacturing the head chip according to the first embodiment, and is a cross-sectional view corresponding to FIG. 4.

As shown in FIG. 17, in the actuator second-processing step S06, grinding processing is performed on the lower surface of the actuator plate 54 (a grinding step). On this occasion, on the lower surface of the actuator plate 54, the actuator plate 54 is ground up to a position where the recessed parts 100, 101 open to thereby form the common interconnecting holes 91 and the individual interconnecting holes 93.

Figure 18:
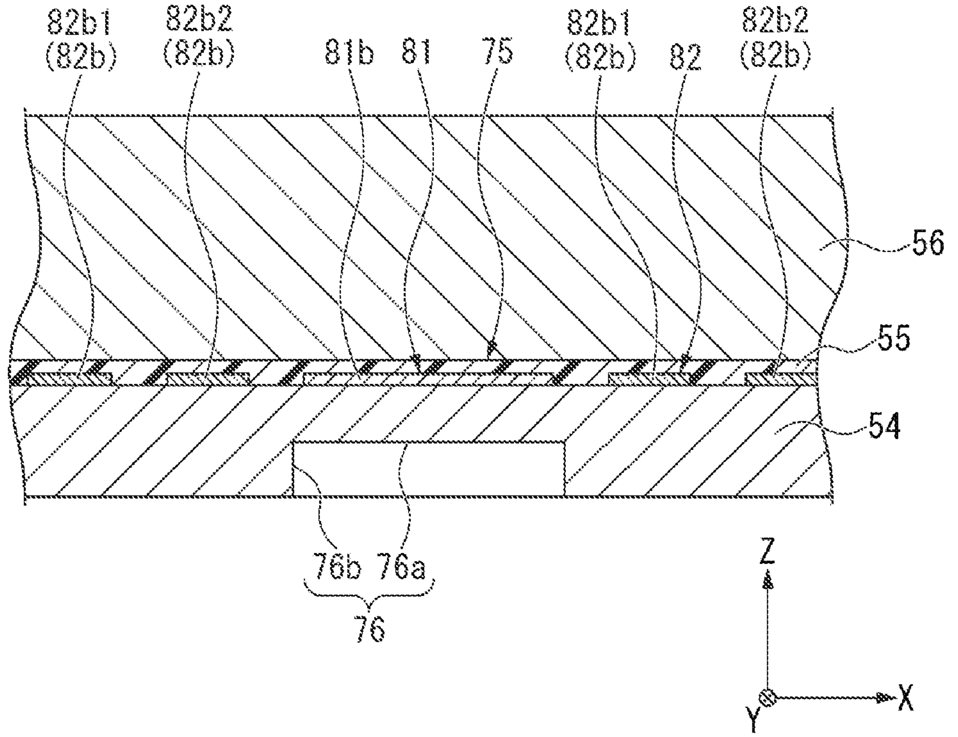
FIG. 18 is a process chart for explaining the method of manufacturing the head chip according to the first embodiment, and is a cross-sectional view corresponding to FIG. 4.

Then, as shown in FIG. 18, in the actuator second-processing step S06, the recessed part 76 is provided (a recessed part formation step) to the lower surface of the actuator plate 54. The recessed part 76 is formed by, for example, performing dicer processing on the lower surface of the actuator plate 54.

Figure 19:
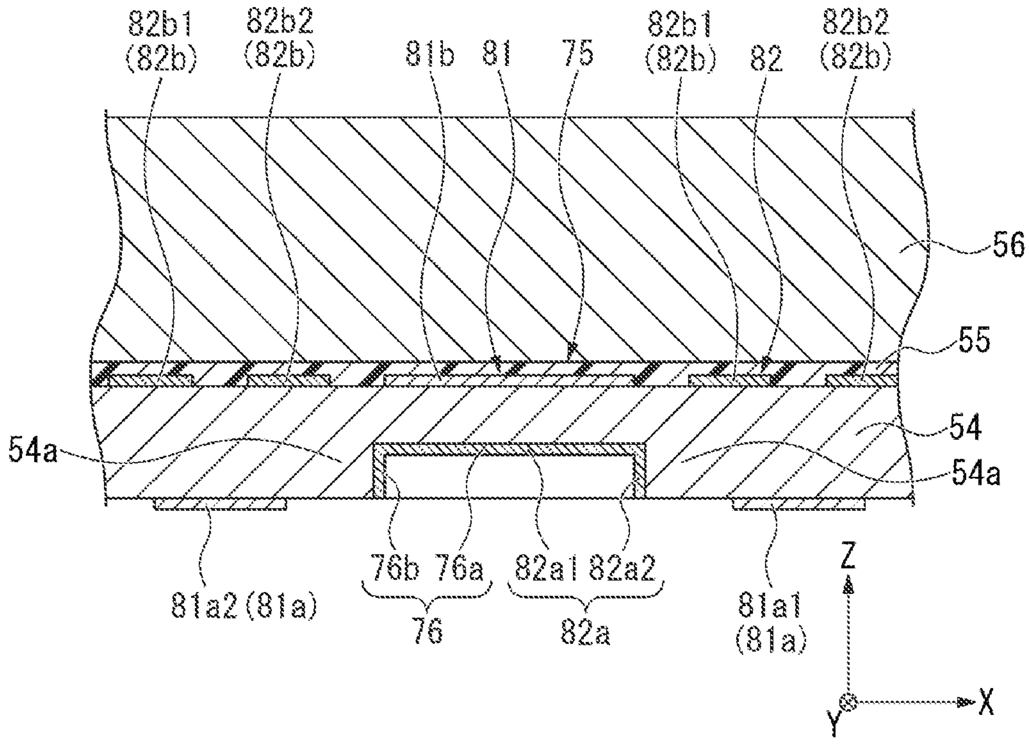
FIG. 19 is a process chart for explaining the method of manufacturing the head chip according to the first embodiment, and is a cross-sectional view corresponding to FIG. 4.

As shown in FIG. 19, there are formed portions of the drive interconnections 75, the portions being located on the lower surface of the actuator plate 54, the inner surfaces of the recessed part 76, and the inner surfaces of the interconnecting holes 91, 93 (a second interconnection formation step). In the second interconnection formation step, first, a mask pattern in which formation areas of the drive interconnections 75 open is formed on the lower surface of the actuator plate 54. Subsequently, an electrode material is deposited on the actuator plate 54 using, for example, vapor deposition. The electrode material is deposited on the actuator plate 54 through the opening parts of the mask pattern. Thus, the drive interconnections 75 are formed on the lower surface of the actuator plate 54, the inner surfaces of the recessed part 76, and the inner surfaces of the interconnecting holes 91, 93.

Figure 20:
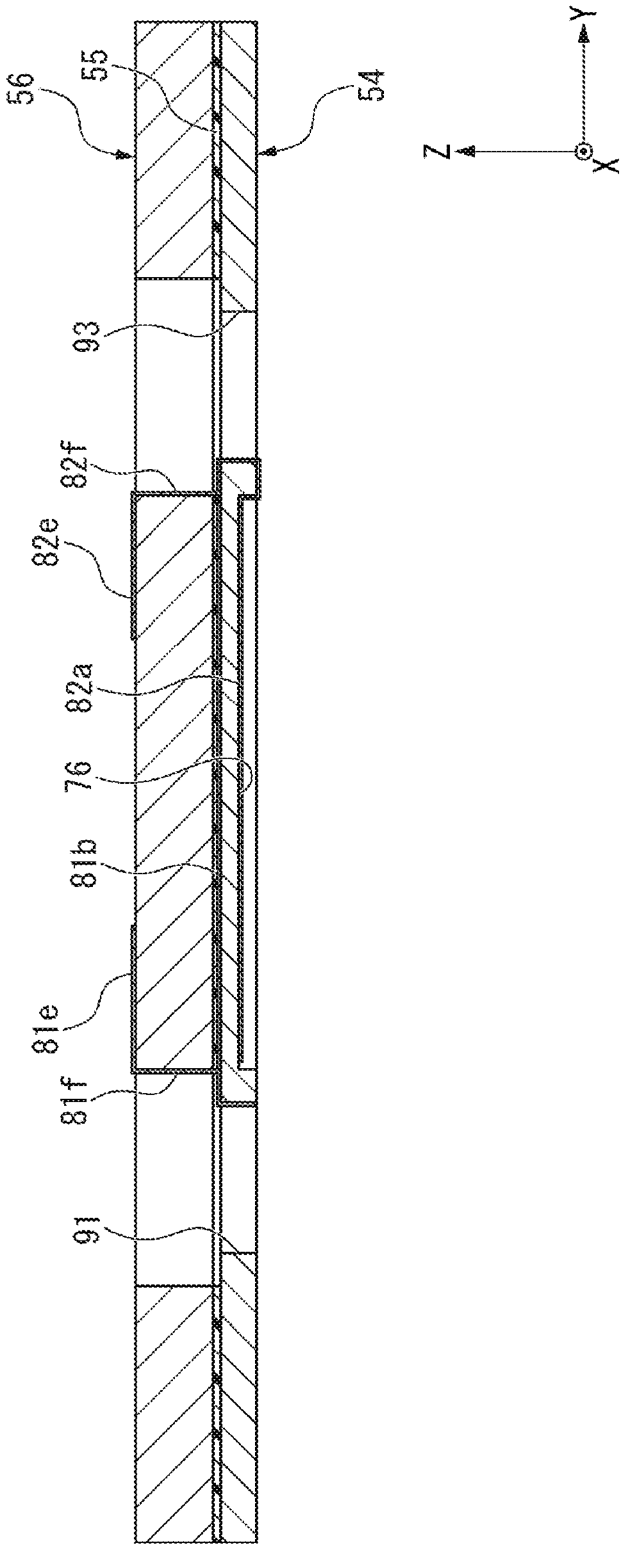
FIG. 20 is a process chart for explaining the method of manufacturing the head chip according to the first embodiment, and is a cross-sectional view corresponding to FIG. 5.

As shown in FIG. 20, in the cover second-processing step S07, the pads 81*e*, 82*e* and the through interconnections 81*f*, 82*f* are provided to the cover plate 56. Specifically, first, a mask pattern in which formation areas of the pads 81*e*, 82*e* and the through interconnections 81*f*, 82*f* open is formed on the upper surface of the cover plate 56. Then, the electrode material is deposited on the cover plate 56 using, for example, vapor deposition. The electrode material is deposited on the cover plate 56 through the opening parts of the mask pattern. Thus, the pads 81*e*, 82*e* and the through interconnections 81*f*, 82*f* are formed.

Figure 21:
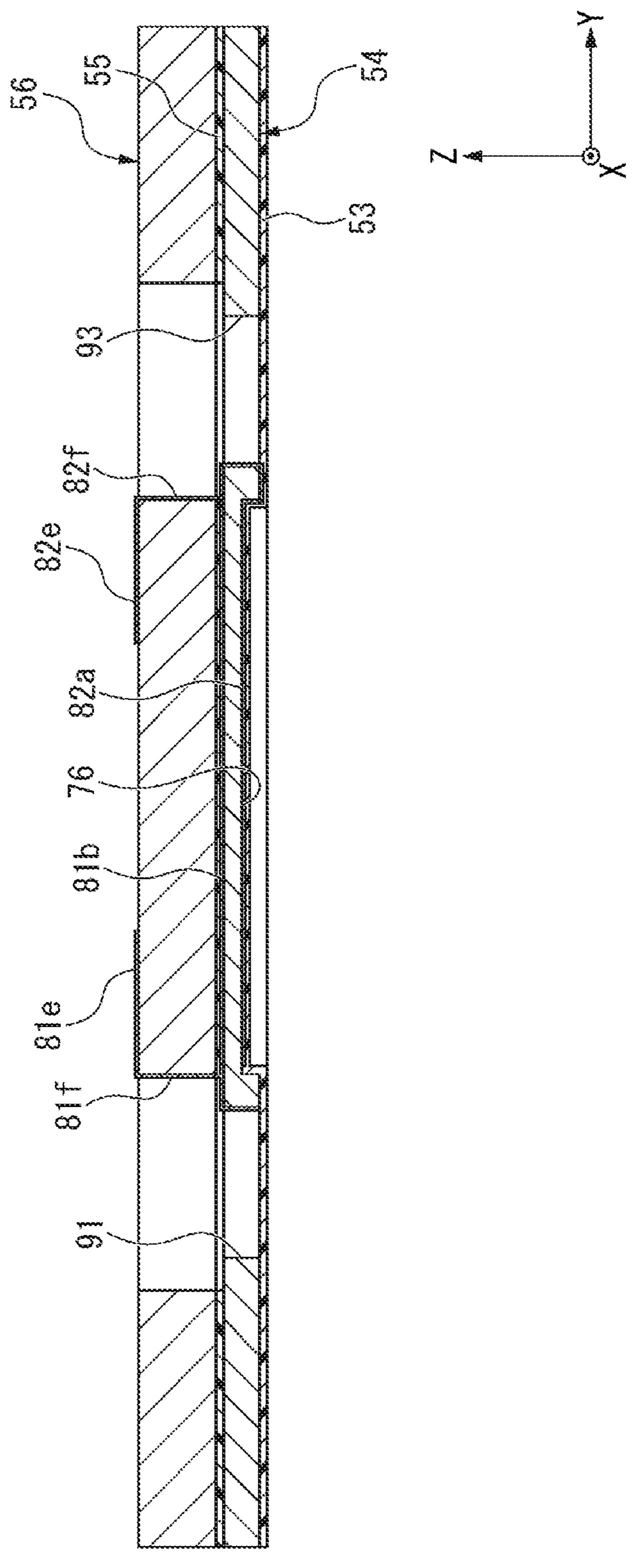
FIG. 21 is a process chart for explaining the method of manufacturing the head chip according to the first embodiment, and is a cross-sectional view corresponding to FIG. 5.

As shown in FIG. 21, in the third bonding step S08, the first film 53 is attached to the lower surface of the actuator plate 54 with an adhesive or the like.

Figure 22:
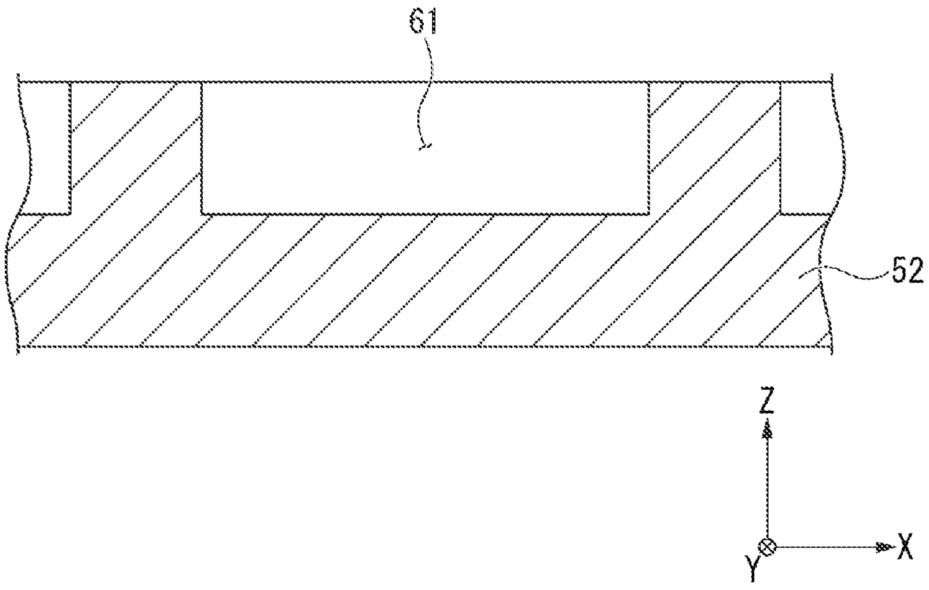
FIG. 22 is a process chart for explaining the method of manufacturing the head chip according to the first embodiment, and is a cross-sectional view corresponding to FIG. 4.

As shown in FIG. 22, in the flow channel member first-processing step S09, the flow channels 60 (see FIG. 6) and the pressure chambers 61 are provided to the flow channel member 52. The flow channels 60 and the pressure chambers 61 are formed by performing, for example, cutting processing by a dicer or sandblasting on the flow channel member 52. Then, portions of the flow channel member 52, the portions each partitioning the pressure chambers 61 adjacent to each other, remain as the partition wall 62.

Figure 23:
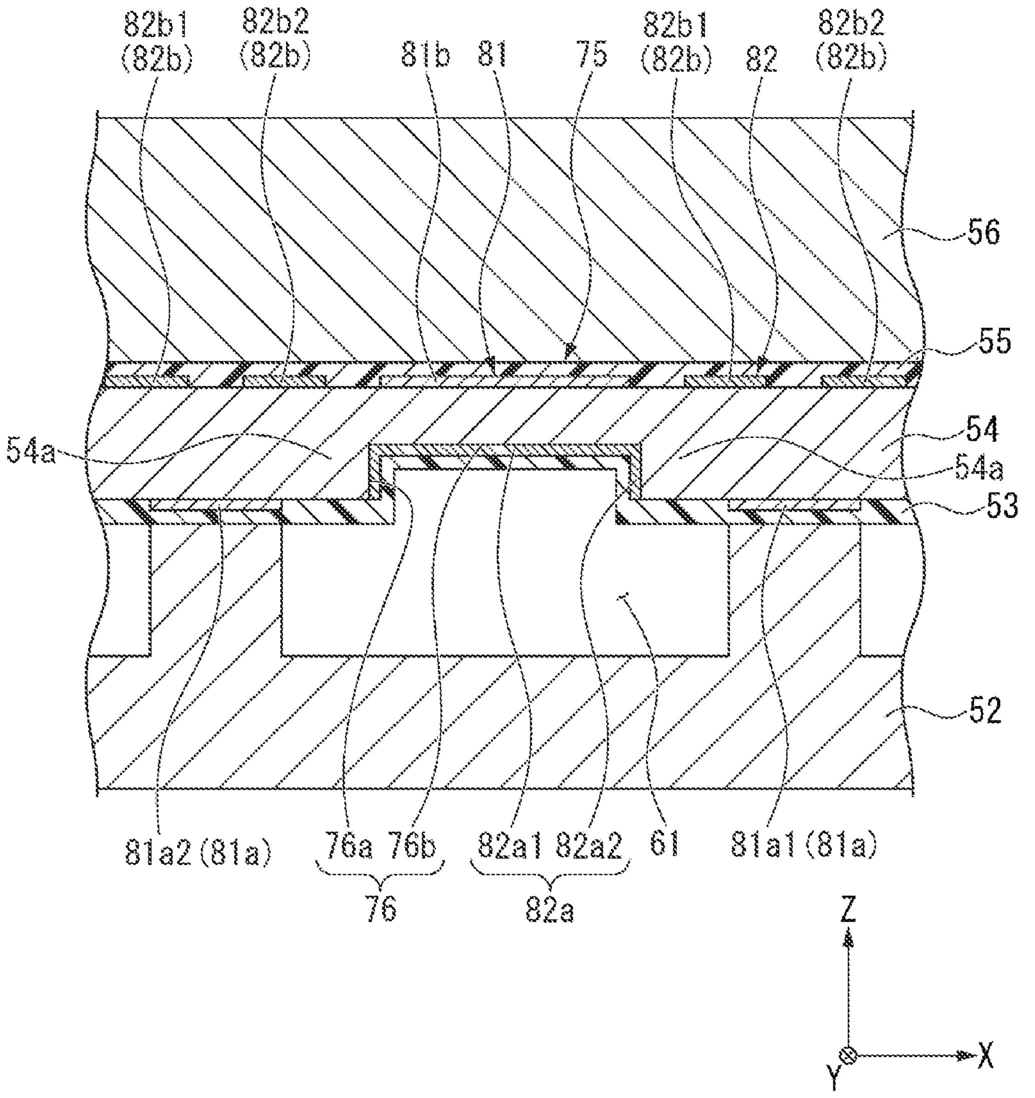
FIG. 23 is a process chart for explaining the method of manufacturing the head chip according to the first embodiment, and is a cross-sectional view corresponding to FIG. 4.

As shown in FIG. 23, in the fourth bonding step S10, the flow channel member 52 is attached to the lower surface of the first film 53 with an adhesive or the like.

Figure 24:
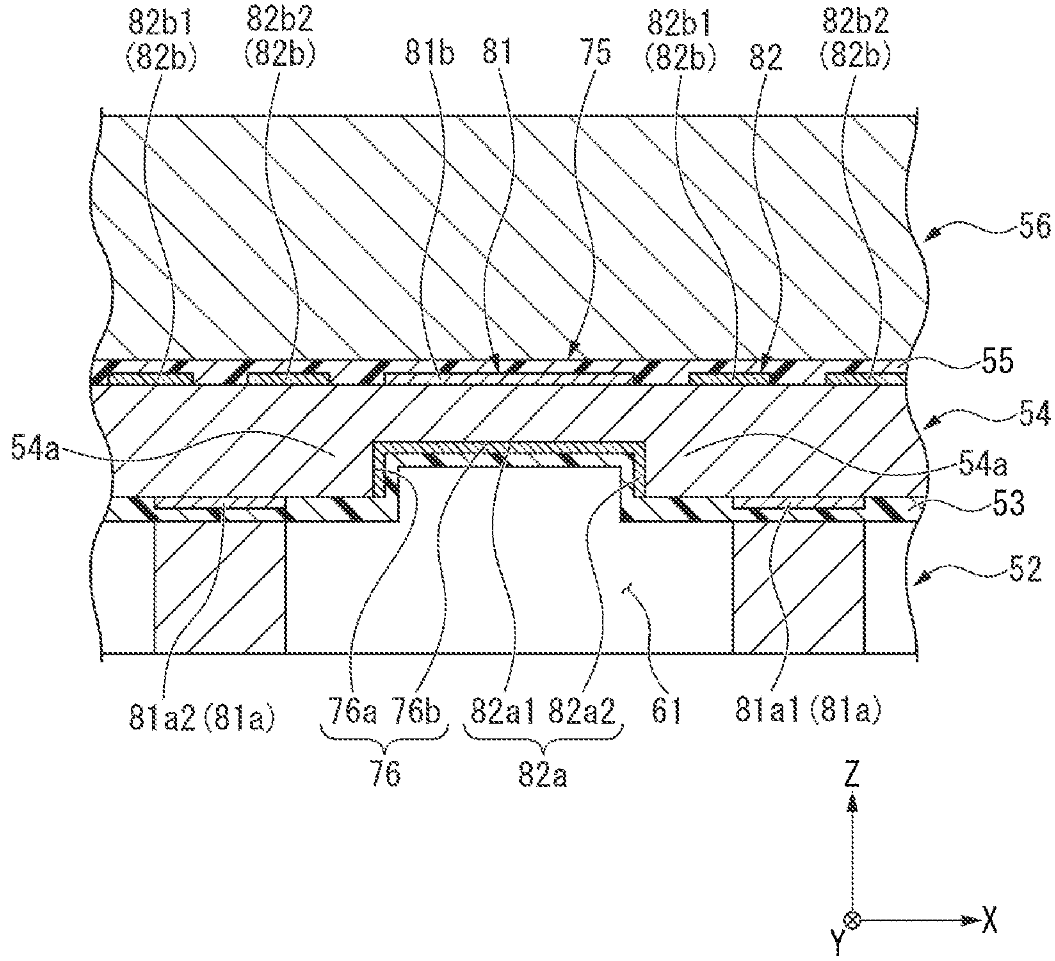
FIG. 24 is a process chart for explaining the method of manufacturing the head chip according to the first embodiment, and is a cross-sectional view corresponding to FIG. 4.

As shown in FIG. 24, in the flow channel member second-processing step S11, the grinding processing is performed on the lower surface of the flow channel member 52 (the grinding step). On this occasion, on the lower surface of the flow channel member 52, the flow channel member 52 is ground up to a position where the flow channels 61 and the pressure chambers 61 open.

In the fifth bonding step S12, the nozzle plate 51 is attached to the lower surface of the flow channel member 52 in a state in which the nozzle holes 71 and the pressure chambers 61 are aligned with each other.

Due to the steps described hereinabove, the head chip 50 is completed.

Here, in the head chip 50 according to the first embodiment, there is adopted the configuration provided with the first individual electrodes (first electrodes) 82*a* formed on the inner surfaces of the recessed part (the shape changing part) 76 on the lower surface of the actuator plate 54, and the second common electrodes (first opposed electrodes) 81*b* arranged so as to be opposed to the first individual electrodes 82*a* on the upper surface of the actuator plate 54.

According to this configuration, by generating the potential difference between the first individual electrodes 82*a* and the second common electrodes 81*b*, it is possible to generate the electric field in the polarization direction of the actuator plate 54. Thus, by deforming the actuator plate 54 in the Z direction in the bend mode (a bimorph type), it is possible to vary the volume of the pressure chamber 61.

In particular, in the present embodiment, by forming the first individual electrodes 82*a* on the inner surfaces of the recessed part 76, it is possible to ensure the surface area of each of the first individual electrodes 82*a*. Therefore, it is easy to ensure the potential difference generated between the first individual electrode 82*a* and the second common electrode 81*b*. As a result, it is possible to increase the electric field generated in the actuator plate 54, and thus, it is possible to increase the pressure to be generated in the pressure chamber 61 when ejecting the ink. Further, since it is possible to increase the pressure to be generated only by forming the first individual electrodes 82*a* on the inner surfaces of the recessed part 76, it is possible to achieve an increase in manufacturing efficiency and yield ratio compared to a configuration in which a plurality of actuator plates is stacked as in the related art. Moreover, by providing the recessed part 76 to the actuator plate 54, it is possible to increase the rigidity in the Z direction of the actuator plate 54.

In the head chip 50 according to the first embodiment, there is adopted the configuration in which the first individual electrode 82*a* is provided with the bottom-surface electrode 82*a*1 formed on the bottom surface (the end surface facing to the first direction) 76*a* of the recessed part 76, and the side-surface electrodes 82*a*2 formed on the inner side surfaces (side surfaces) 76*b* of the recessed part 76.

According to this configuration, since it is possible to ensure the surface area of the first individual electrode 82*a*, it is possible to increase the pressure to be generated in the pressure chamber 61 when ejecting the ink.

Moreover, by forming the bottom-surface electrode 82*a*1 on the bottom surface 76*a* of the recessed part 76, it is possible to decrease the distance between the second common electrode 81*b* and the first individual electrode 82*a*. Thus, it becomes easy to increase the electric field to be generated in the actuator plate 54, and thus, it is possible to effectively increase the pressure to be generated in the pressure chamber 61.

There is adopted the configuration in which the head chip 50 according to the first embodiment is provided with the first common electrode (a second electrode) 81*a* formed adjacent to the first individual electrode 82*a* on the lower surface of the actuator plate 54.

According to this configuration, by generating the potential difference between the first individual electrodes 82*a* and the first common electrodes 81*a*, it is possible to generate the electric field in a direction crossing the polarization direction of the actuator plate 54. Thus, by deforming the actuator plate 54 in the Z direction in the shear mode (the roof-shoot type), it is possible to change the volume of the pressure chamber 61. In this case, it is possible to deform the actuator plate 54 in the Z direction in both of the drive modes, namely the shear mode and the bend mode, and thus, it is possible to increase the pressure to be generated in the pressure chamber 61.

Moreover, in the present embodiment, since the side-surface electrode 82*a*2 is formed on the inner side surface 76*b* of the recessed part 76, the electric field is generated in a state of facing downward in a direction toward the outside in the X direction due to the potential difference generated between the side-surface electrode 82*a*2 and the first common electrode 81*a*. Therefore, it is easy for the deformation facilitating part 54*a* of the actuator plate 54 to deform so as to rise upward from each of the side walls 62*a*, 62*b*. Specifically, when the actuator plate 54 is restored, by the deformation facilitating part 54*a* deforming toward the inner side in the X direction along a downward direction, it is possible to effectively pressurize the inside of the pressure chamber 61. As a result, it is possible to effectively increase the pressure to be generated in the pressure chamber 61.

In the head chip 50 according to the first embodiment, there is adopted the configuration in which the second individual electrode (a second opposed electrode) 82*b* which is opposed to the first common electrode 81*a*, and at the same time, which is disposed adjacent to the second common electrode 81*b* is formed on the upper surface of the actuator plate 54.

According to this configuration, since the second common electrode 81*b* and the second individual electrode 82*b* are formed adjacent to each other on the upper surface of the actuator plate 54, it is possible to deform the actuator 54 in the shear mode (the roof-shoot type) due to the potential difference generated between the second common electrode 81*b* and the second individual electrode 82*b*.

Further, it is possible to deform the actuator plate 54 in the bend mode due to the potential difference generated between the first common electrode 81*a* and the second individual electrodes 82*b*. As a result, it is possible to achieve a further increase in pressure to be generated, and the power saving.

Since the inkjet head 5 and the printer 1 according to the first embodiment are each equipped with the head chip 50 described above, it is possible to provide the inkjet head 5 and the printer 1 which are high in quality and capable of exerting the desired ejection performance.

Second Embodiment

Figure 25:
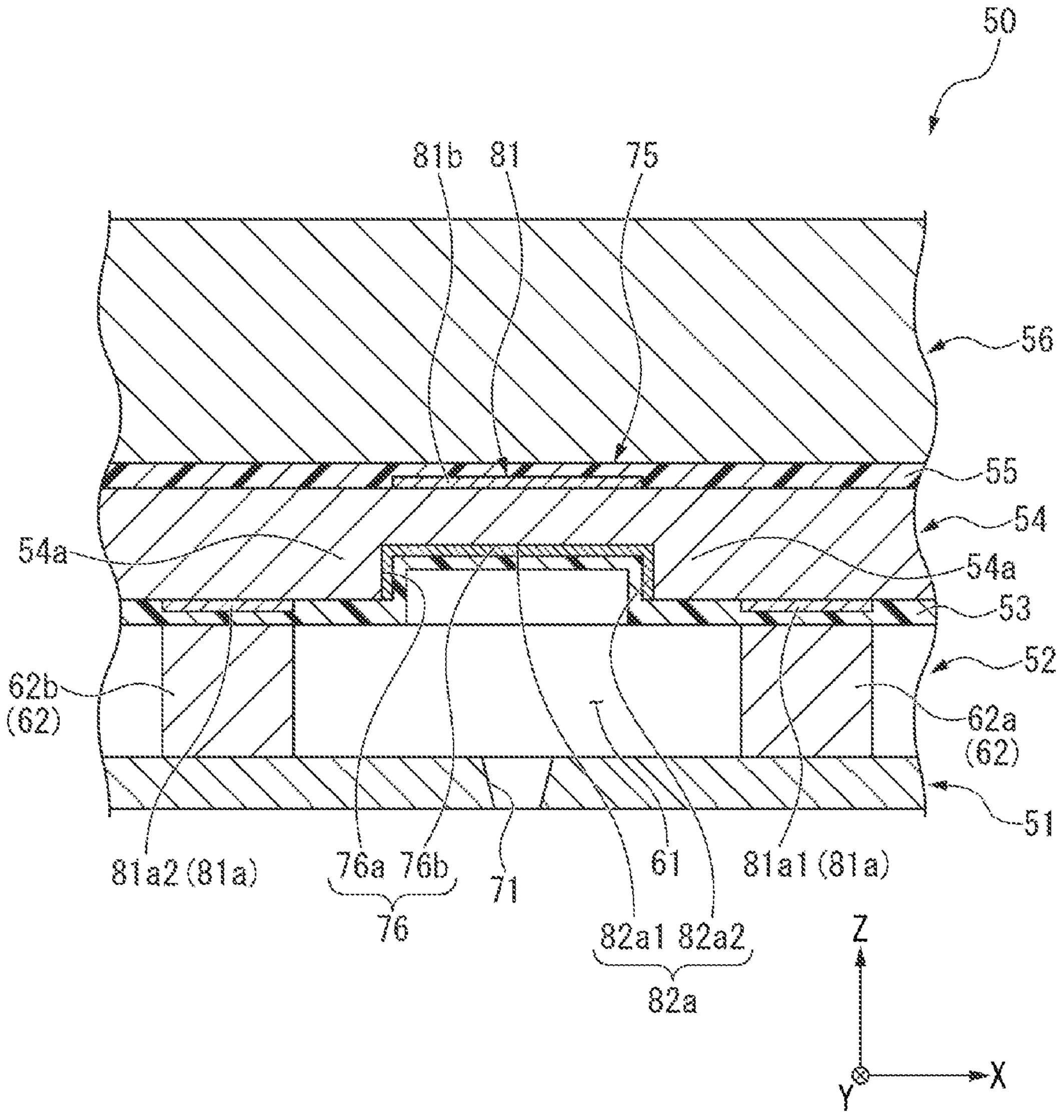
FIG. 25 is a cross-sectional view of a head chip according to a second embodiment.

FIG. 25 is a cross-sectional view of a head chip 50 according to a second embodiment.

As shown in FIG. 25, the head chip 50 according to the second embodiment has a configuration in which the second individual electrodes 82*b* (see FIG. 4) are eliminated from the head chip 50 according to the first embodiment. Therefore, only the second common electrodes 81*b* are formed on the upper surface of the actuator plate 54.

According to the second embodiment, by eliminating the second individual electrodes 82*b*, it is possible to reduce the area of the electrodes, and thus, it is possible to reduce the capacitance of the actuator plate 54. Therefore, it is possible to improve a response characteristic of the actuator plate 54, and at the same time, it is possible to suppress the heat generation in the actuator plate 54.

Third Embodiment

Figure 26:
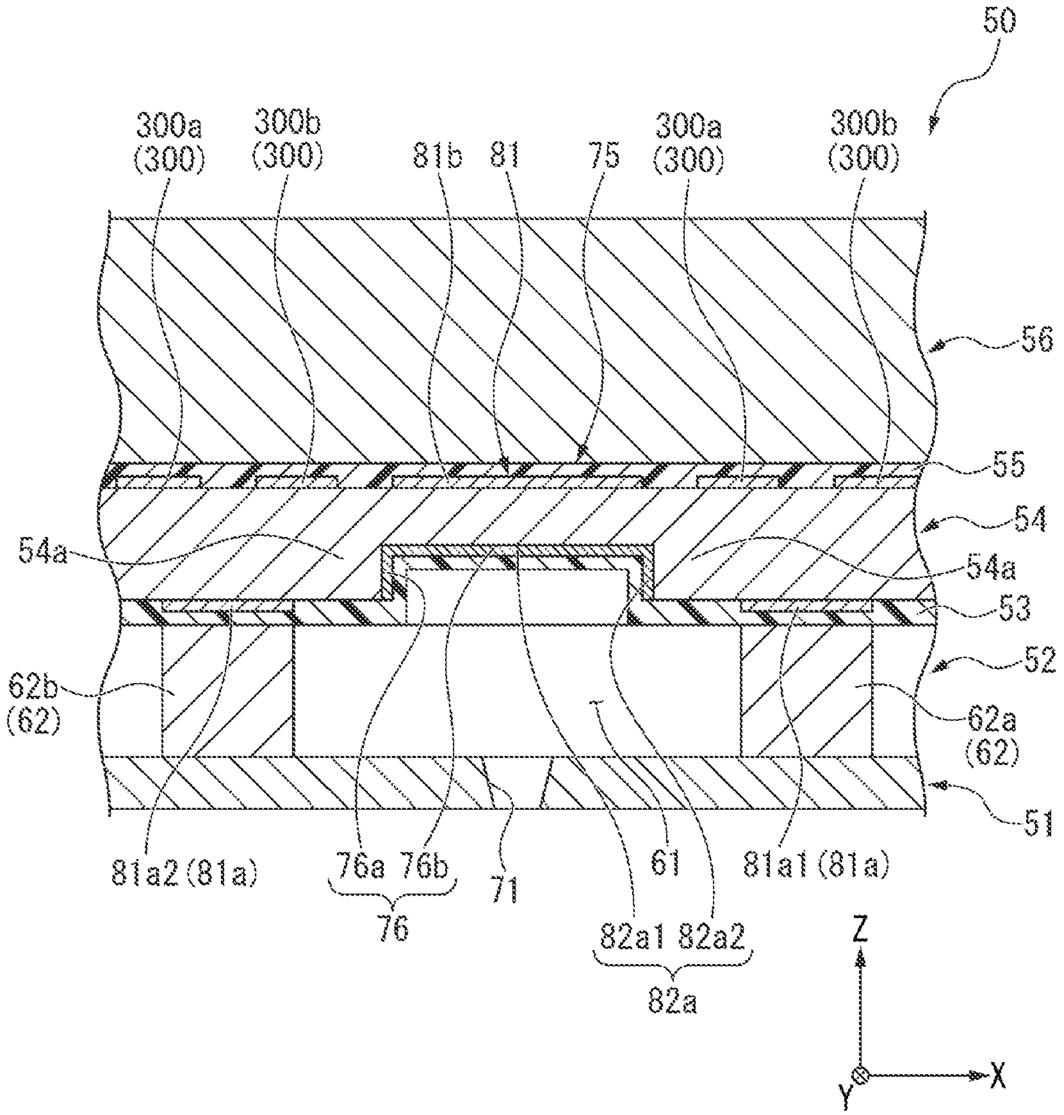
FIG. 26 is a cross-sectional view of a head chip according to a third embodiment.

FIG. 26 is a cross-sectional view of a head chip 50 according to a third embodiment.

In the head chip 50 shown in FIG. 26, at positions on the upper surface of the actuator plate 54, the positions being opposed to the first common electrodes 81*a*, there are formed third common electrodes 300. The third common electrodes 300 are respectively formed in portions located at both sides in the X direction with respect to the second common electrode 81*b*. The third common electrodes 300 extend in the Y direction in a state of being separated in the X direction from the second common electrode 81*b*.

A part of the third common electrode 300*a* located at the +X side out of the third common electrodes 300 overlaps the side wall 62*a* when viewed from the Z direction. The third common electrode 300*a* is opposed to the +X-side common electrode 81*a*1 in the Z direction on the side wall 62*a*.

A part of the third common electrode 300*b* located at the −X side out of the third common electrodes 300 overlaps the side wall 62*b* when viewed from the Z direction. The third common electrode 300*b* is opposed to the −X-side common electrode 81*a*2 in the Z direction on the side wall 62*b*. It should be noted that between the pressure chambers 61 adjacent to each other, the third common electrode 300*a* in one pressure chamber 61 and the third common electrode 300*b* in the other pressure chamber 61 are at a distance in the X direction from each other on the side walls 62*a*, 62*b*.

In the head chip 50 according to the third embodiment, since only the common electrodes (the second common electrodes 81*b* and the third common electrodes 300) are arranged on the upper surface of the actuator plate 54, it is possible to prevent the risk of short circuit on the upper surface of the actuator plate 54. It should be noted that it is possible to integrate the second common electrodes 81*b* and the third common electrodes 300 with each other.

Fourth Embodiment

Figure 27:
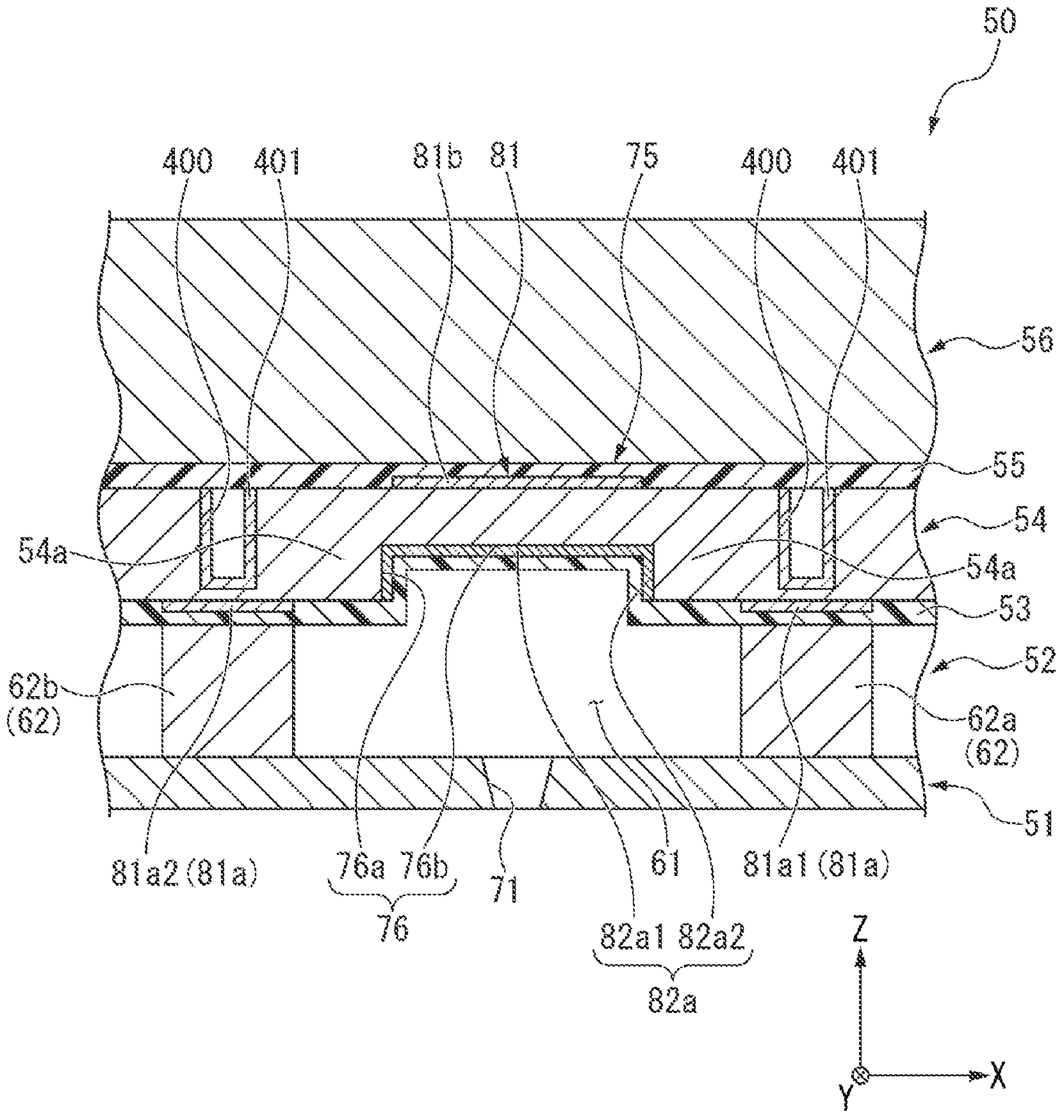
FIG. 27 is a cross-sectional view of a head chip according to a fourth embodiment.
Figure 28:
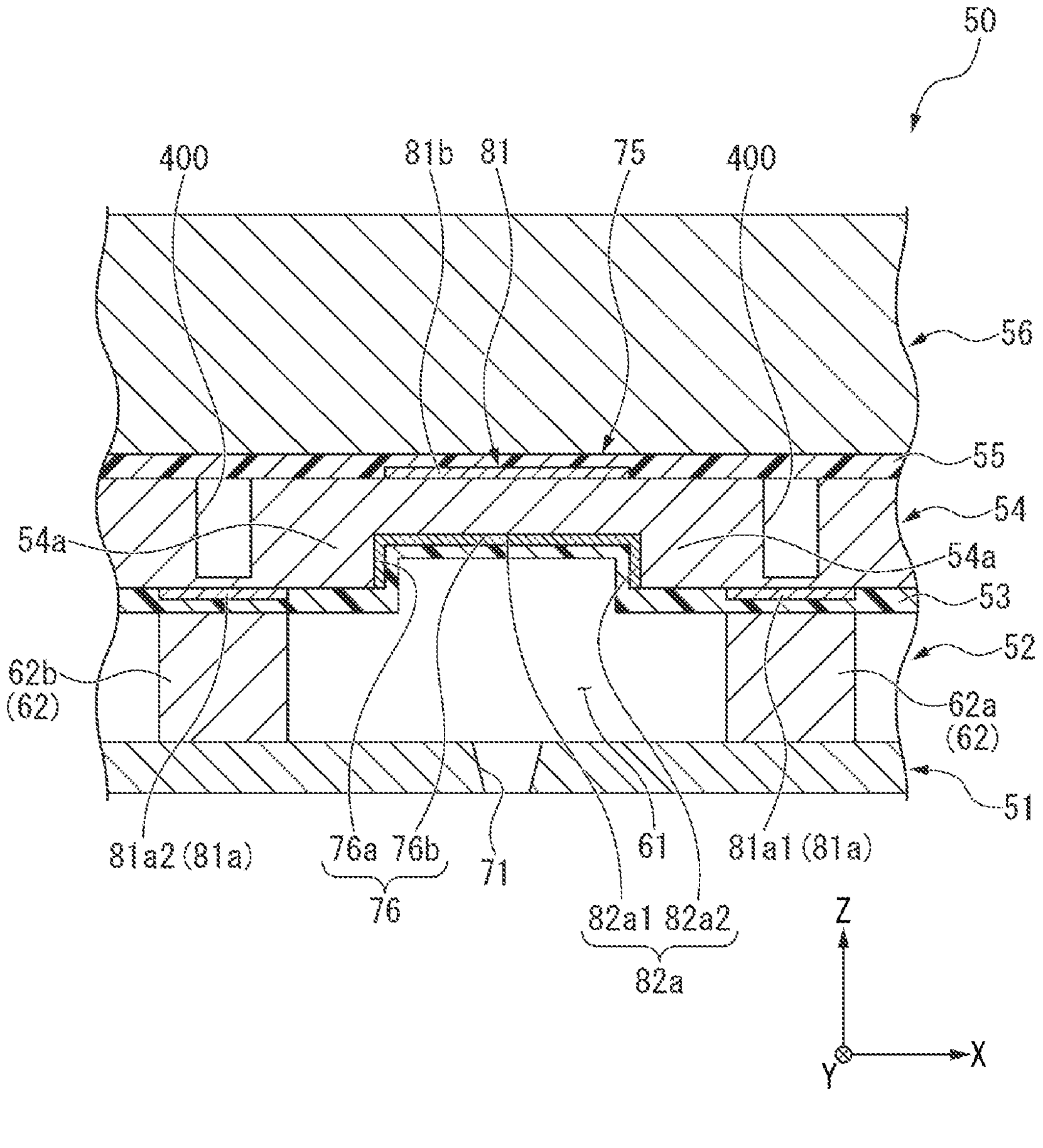
FIG. 28 is a cross-sectional view of a head chip according to a modified example of the fourth embodiment.

FIG. 27 is a cross-sectional view of a head chip 50 according to a fourth embodiment.

In the head chip 50 shown in FIG. 27, on the upper surface of the actuator plate 54, there are formed groove parts 400. The groove parts 400 are respectively disposed at both sides in the X direction with respect to the second common electrode 81*b* on the upper surface of the actuator plate 54. In the illustrated example, the groove parts 400 are respectively disposed at positions opposed in the Z direction to the side walls 62*a*, 62*b*. It should be noted that the groove parts 400 can be disposed at positions opposed in the Z direction to the corresponding pressure chambers 61.

The depth in the Z direction in the groove part 400 is deeper than the depth in the Z direction in the recessed part 76. The width in the X direction of the groove part 400 is narrower than the width in the X direction of the recessed part 76. It should be noted that the length in the Y direction in the groove part 400 is made equivalent to the length in the Y direction in the recessed part 76. It should be noted that a variety of dimensions of the groove part 400 can arbitrarily be changed.

On inner surfaces of the groove part 400, there is formed a third common electrode (an in-groove electrode) 401. In the present embodiment, the third common electrode 401 is formed throughout the entire area of the inner surfaces of the groove part 400. It should be noted that it is sufficient for the third common electrode 401 to be formed on at least a part of the inner surfaces of the groove part 400.

In the head chip 50 according to the fourth embodiment, the electric field is generated in the actuator plate 54 in a direction crossing the polarization direction due to the potential difference generated between the first individual electrode 82*a* and the third common electrode 401. As a result, a thickness-shear deformation occurs in the deformation facilitating part 54*a* (a portion partitioned by the recessed part 76 and the groove part 400) of the actuator plate 54 so as to fall over outward in the X direction in an upward direction in the shear mode. Thus, when ejecting the ink, the deformation facilitating part 54*a* deforms so that the volume of the groove part 400 expands or contracts. In other words, since the groove part 400 functions as a clearance part for allowing the deformation of the deformation facilitating part 54*a*, it becomes easy to ensure an amount of deformation of the actuator plate 54, and thus, it is possible to increase the pressure to be generated in the pressure chamber 61.

It should be noted that in the fourth embodiment, there is described the configuration in which the third common electrode 401 is provided to the groove part 400, but this configuration is not a limitation. For example, it is possible to dispose only the groove parts 400 at the both sides in the X direction with respect to the recessed part 76 in the actuator plate 54. According also to such a configuration as described above, when the portions of the actuator plate 54, the portions corresponding to the respective pressure chambers 61, deform upward, the groove parts 400 function as the clearance parts for allowing the deformation of the actuator plate 54. Thus, it becomes easy to ensure the amount of the deformation of the actuator plate 54.

Fifth Embodiment

Figure 29:
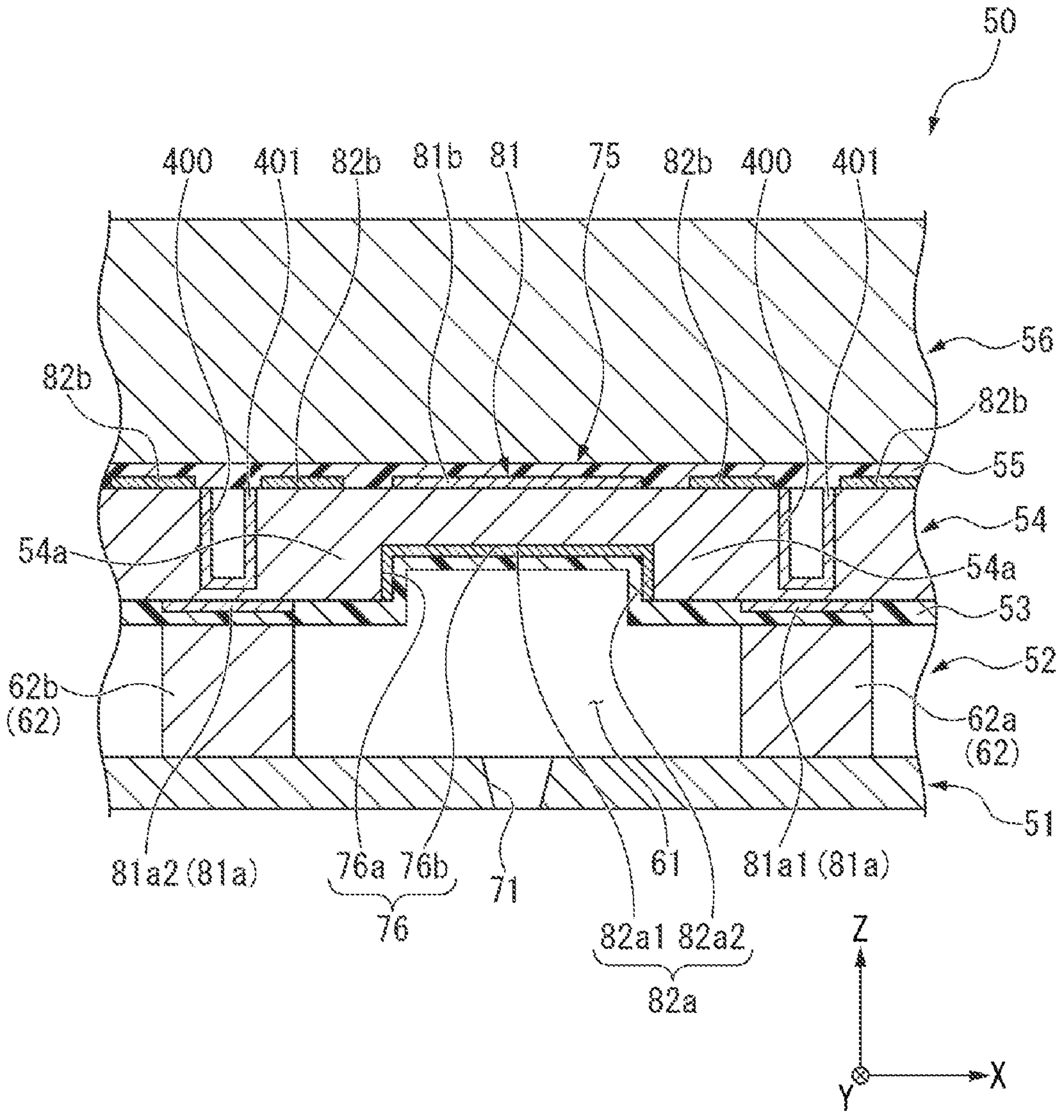
FIG. 29 is a cross-sectional view of a head chip according to a fifth embodiment.

In a head chip 50 shown in FIG. 29, in a portion of the upper surface of the actuator plate 54, the portion being located at an inner side in the X direction with respect to the groove part 400, there is disposed the second individual electrode 82*b*. The second individual electrode 82*b* extends in the Y direction in a state at a distance between the second common electrode 81*b* and the third common electrode 401.

In the fifth embodiment, it is possible to make the thickness-shear deformation in the Z direction in the actuator plate 54 in the shear mode due to the potential difference generated between the second common electrode 81*b* and the second individual electrode 82*b* when ejecting the ink. Thus, it is possible to increase the pressure to be generated in the pressure chamber 61.

Sixth Embodiment

Figure 30:
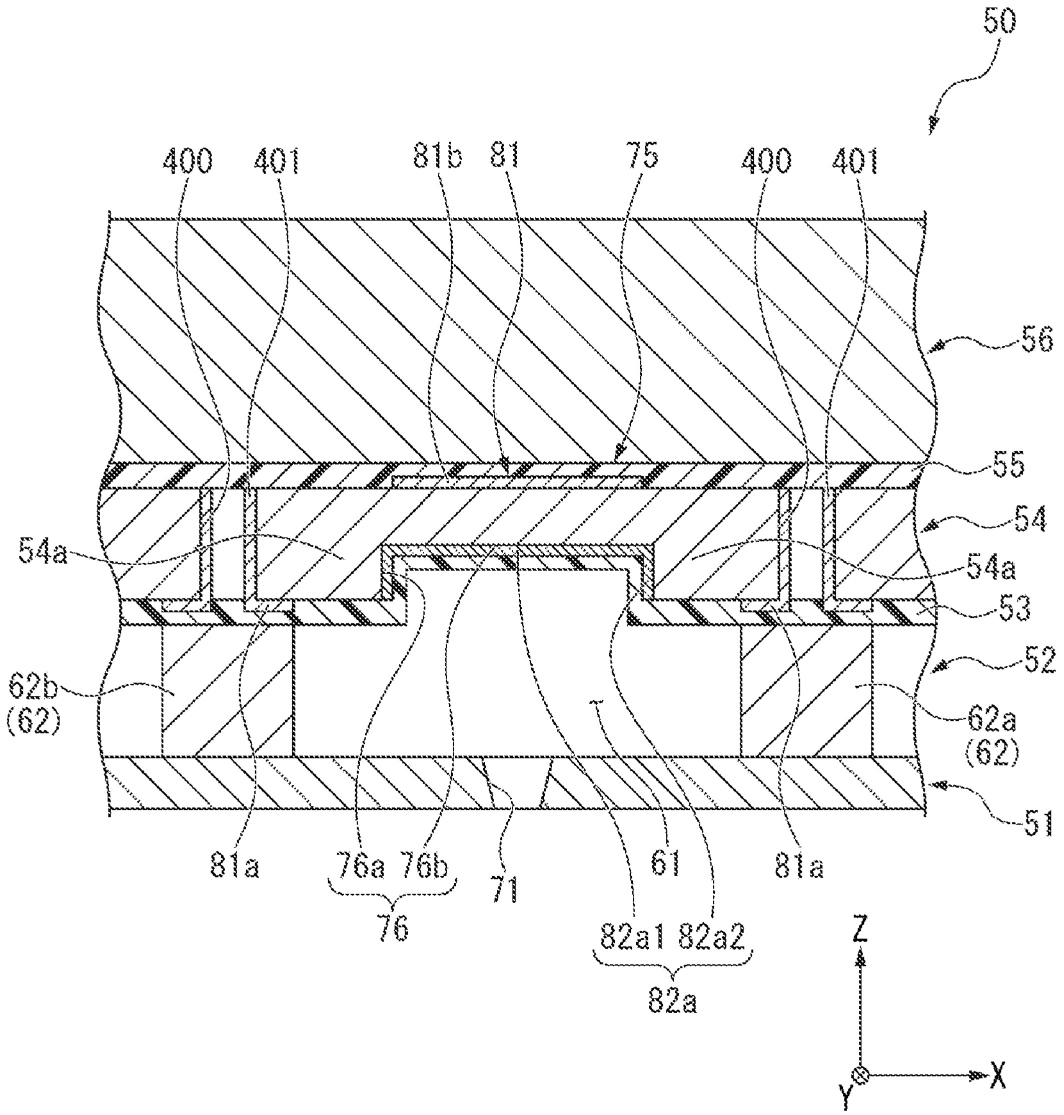
FIG. 30 is a cross-sectional view of a head chip according to a sixth embodiment.

In a head chip 50 shown in FIG. 30, the groove part 400 penetrates the actuator plate 54. In the illustrated example, the third common electrode 401 and the first common electrode 81*a* are integrally connected to each other. It should be noted that the third common electrode 401 and the first common electrode 81*a* can be separated from each other.

In the sixth embodiment, since the groove part 400 penetrates the actuator plate 54, it is easy to allow the deformation of the deformation facilitating part 54*a* when ejecting the ink. Therefore, it is possible to increase the pressure to be generated in the pressure chamber 61.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet heads move with respect to the recording target medium when performing printing as an example, but this configuration is not a limitation. The configuration related to the present disclosure can be adopted as the configuration (a so-called stationary head machine) in which the recording target medium is moved with respect to the inkjet heads in the state in which the inkjet heads are fixed.

In the embodiments described above, there is explained when the recording target medium P is paper, but this configuration is not a limitation. The recording target medium P is not limited to paper, but can also be a metal material or a resin material, and can also be food or the like.

In the embodiments described above, there is explained the configuration in which the liquid jet heads are installed in the liquid jet recording device, but this configuration is not a limitation. Specifically, the liquid to be jetted from the liquid jet heads is not limited to what is landed on the recording target medium, but can also be, for example, a medical solution to be blended during a dispensing process, a food additive such as seasoning or a spice to be added to food, or fragrance to be sprayed in the air.

In the embodiments described above, there is explained the configuration in which the Z direction coincides with the gravitational direction, but this configuration is not a limitation, and it is also possible to set the Z direction to a direction along the horizontal direction.

In the embodiments described above, the description is presented citing the head chip 50 of the recirculating side-shoot type as an example, but this configuration is not a limitation. The head chip can be of a so-called edge-shoot type for ejecting the ink from an end portion in the extending direction (the Y direction) in the pressure chamber 61.

In the embodiments described above, there is described the configuration in which the actuator plate 54 is deformed due to both of the shear deformation mode and the bend deformation mode, but this configuration is not a limitation. In the head chip 50 according to the present disclosure, it is possible to deform the actuator plate 54 in at least the bend mode. When adopting only the bend mode, it is sufficient for the common electrode and the individual electrode to be arranged so as to be opposed to each other on the both surfaces of the actuator plate 54 at a position overlapping at least the recessed part 76 when viewed from the Z direction.

In the embodiments described above, there is explained the configuration in which the first individual electrode 82*a* is formed on the inner surfaces of the recessed part 76, and the second common electrode 81*b* is formed on the upper surface of the actuator plate 54, but this configuration is not a limitation. It is possible to form the common electrode on the inner surfaces of the recessed part 76, and form the individual electrode in a portion of the upper surface of the actuator plate 54, the portion being opposed to the recessed part 76.

In the embodiments described above, there is explained the configuration (so-called pulling-shoot) of deforming the actuator plate 54 in the direction of increasing the volume of the pressure chamber 61 due to the application of the drive voltage, and then restoring the actuator plate 54 to thereby eject the ink, but this configuration is not a limitation. It is possible for the head chip according to the present disclosure to be provided with a configuration (so-called pushing-shoot) in which the ink is ejected by deforming the actuator plate 54 in a direction of reducing the volume of the pressure chamber 61 due to the application of the voltage. When performing the pushing-shoot, the actuator plate 54 deforms so as to bulge toward the inside of the pressure chamber 61 due to the application of the drive voltage. Thus, the volume in the pressure chamber 61 decreases to increase the pressure in the pressure chamber 61, and thus, the ink located in the pressure chamber 61 is ejected outside through the nozzle hole 71. When setting the drive voltage to zero, the actuator plate 54 is restored. As a result, the volume in the pressure chamber 61 is restored. It should be noted that the head chip of the pushing-shoot type can be realized by inversely setting either one of the polarization direction and the electric field direction (the layout of the common electrodes and the individual electrodes) of the actuator plate 54 with respect to the head chip of the pulling-shoot type.

Figure 31:
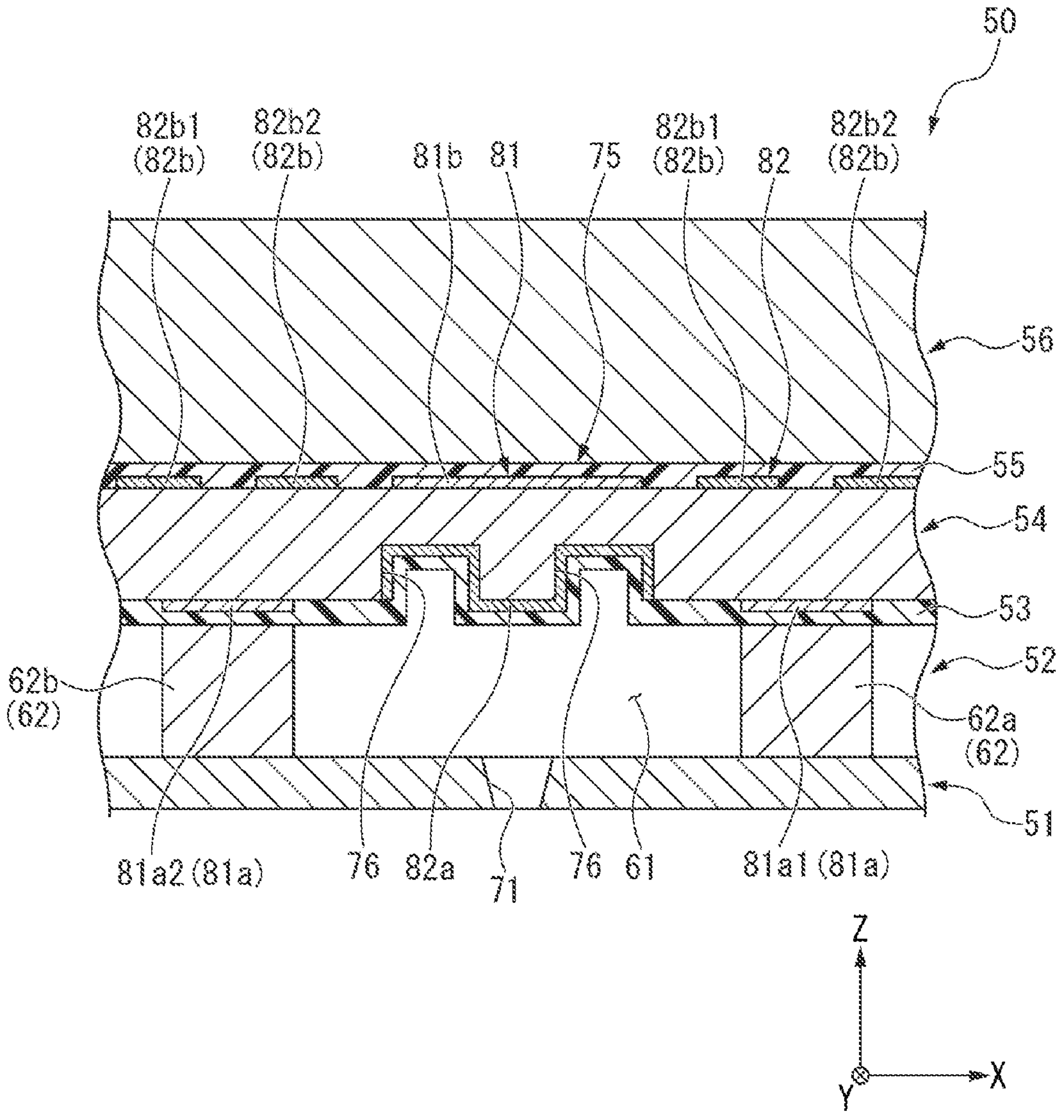
FIG. 31 is a cross-sectional view of a head chip according to a modified example.

In the embodiments described above, there is explained when disposing just one recessed part 76 on the lower surface of the actuator plate 54, but this configuration is not a limitation. For example, it is possible to dispose a plurality of recessed parts 76 as in the head chip 50 shown in FIG. 31. In this case, for example, the first individual electrode 82*a* can be disposed so as to straddle the plurality of recessed parts 76, or can be disposed separately for each of the recessed parts 76. Further, it is possible to dispose the plurality of recessed parts 76 in either of the X direction and the Y direction. In this case, a variety of dimensions of the recessed parts 76 can arbitrarily be changed.

In the embodiments described above, there is explained when the recessed part 76 as the shape changing part is formed to have the rectangular shape when viewed from the Y direction, but this configuration is not a limitation. The recessed part 76 can be formed to have a trapezoidal shape, a triangular shape, a semicircular shape, or the like when viewed from the Y direction.

Figure 32:
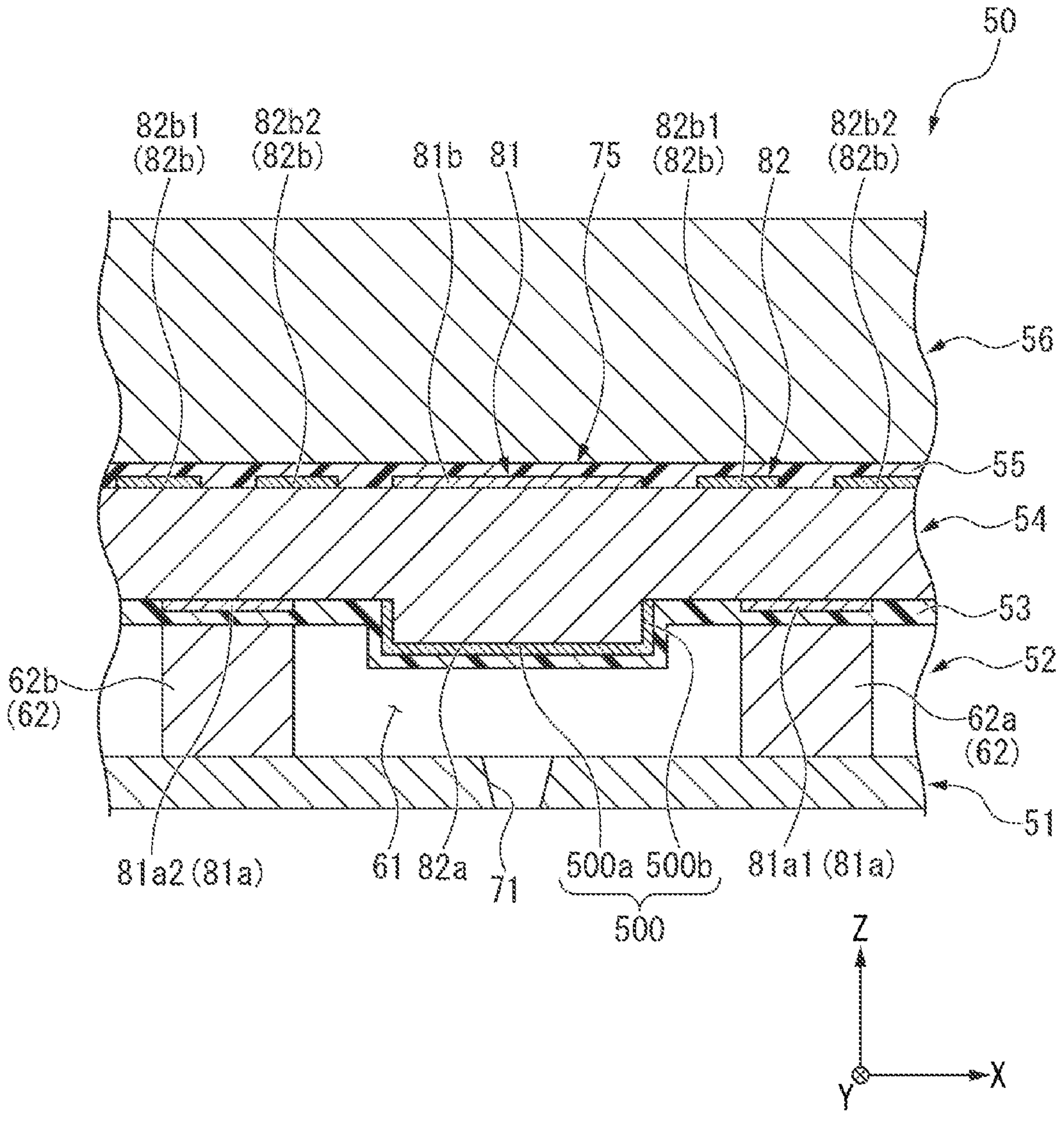
FIG. 32 is a cross-sectional view of a head chip according to a modified example.

In the embodiments described above, there is explained when disposing the recessed part 76 on the lower surface of the actuator plate 54 as an example of the shape changing part, but this configuration is not a limitation. As the shape changing part, it is possible to adopt a protruding part 500 protruding downward with respect to the lower surface of the actuator plate 54 as shown in FIG. 32. In this case, for example, it is sufficient for the first individual electrode 82*a* to be formed in at least a part of a top surface (an end surface facing to the first direction) 500*a* and an outer side surface (a side surface) 500*b* of the protruding part 500. In the illustrated example, the first individual electrode 82*a* is formed throughout the entire area of the top surface 500*a* and the outer side surface 500*b*.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

a flow channel member provided with a pressure chamber containing a liquid;

an actuator plate which is arranged on the flow channel member in a state of being opposed in a first direction to the pressure chamber, and which has a polarization direction set to the first direction; and a drive electrode which is formed on the actuator plate, and which is configured to deform the actuator plate in the first direction to change a volume of the pressure chamber, wherein a shape changing part is formed in a portion of the actuator plate, the shape changing part comprises a protruding part protruding with respect to a first surface facing to the flow channel member in the first direction or a recessed part recessed with respect to the first surface, and the shape changing part overlaps the pressure chamber when viewed from the first direction, and the drive electrode includes a first electrode formed on a surface of the shape changing part, and a first opposed electrode which is formed on a second surface of the actuator plate so as to be opposed to the first electrode, the second surface facing to an opposite side to the first surface in the first direction, and which is configured to generate a potential difference from the first electrode.

2. The head chip according to claim 1, wherein the shape changing part includes an end surface facing to the first direction, and a side surface which is configured to connect an outer circumferential edge of the end surface and the first surface to each other, and which faces to a second direction crossing the first direction, and the first electrode is formed throughout the end surface and the side surface.

3. The head chip according to claim 1, wherein the drive electrode includes a second electrode which is formed on the first surface so as to be adjacent to the first electrode, and which is configured to generate a potential difference from the first electrode.

4. The head chip according to claim 3, wherein the drive electrode includes a second opposed electrode which is formed so as to be opposed to the second electrode on the second surface, and which is formed so as to be adjacent to the first opposed electrode, and the second opposed electrode is configured to generate a potential difference in the first direction from the second electrode, and which is configured to generate a potential difference in a second direction crossing the first direction from the first opposed electrode.

5. The head chip according to claim 1, wherein a groove part recessed in the first direction with respect to the second surface is provided to the actuator plate.

6. The head chip according to claim 5, wherein the groove part penetrates the actuator plate in the first direction.

7. The head chip according to claim 5, wherein an in-groove electrode which generates a potential difference from the first electrode is formed on an inner surface of the groove part.

8. A liquid jet head comprising:

the head chip according to claim 1.

9. A liquid jet recording device comprising:

the liquid jet head according to claim 8.

* * * * *